United States Patent
Lin et al.

(10) Patent No.: US 9,893,572 B2
(45) Date of Patent: Feb. 13, 2018

(54) MOVER AND STATOR ASSEMBLY OF ELECTRIC MACHINE HAVING CONVEX AND CONCAVE PORTIONS FOR A RESPECTIVE STATOR AND ROTOR

(71) Applicant: INDUSTRIAL TECHNOLOGY RESEARCH INSTITUTE, Hsinchu (TW)

(72) Inventors: Cheng-Hsuan Lin, Taoyuan (TW); Han-Ping Yang, Hsinchu (TW); Wen-Yang Peng, Hsinchu County (TW); Chau-Shin Jang, Hsinchu County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 917 days.

(21) Appl. No.: 14/144,810

(22) Filed: Dec. 31, 2013

(65) Prior Publication Data
US 2014/0319935 A1   Oct. 30, 2014

Related U.S. Application Data

(60) Provisional application No. 61/817,515, filed on Apr. 30, 2013.

(30) Foreign Application Priority Data

Oct. 25, 2013   (TW) .............................. 102138640 A

(51) Int. Cl.
*H02K 1/06* (2006.01)
*H02K 21/16* (2006.01)
(Continued)

(52) U.S. Cl.
CPC ............... *H02K 1/06* (2013.01); *H02K 17/16* (2013.01); *H02K 19/103* (2013.01); *H02K 21/16* (2013.01); *H02K 21/24* (2013.01); *H02K 2201/03* (2013.01)

(58) Field of Classification Search
CPC ........ H02K 1/06; H02K 1/182; H02K 1/2793; H02K 16/04; H02K 17/16; H02K 19/103; H02K 21/16; H02K 21/24; H02K 2204/03
(Continued)

(56) References Cited

U.S. PATENT DOCUMENTS 3,189,770 A * 6/1965 Jacques .................... H02K 3/26
310/156.34
3,401,287 A * 9/1968 Park ........................ H02K 19/06
29/596

(Continued)

FOREIGN PATENT DOCUMENTS

CN      101189782 A    5/2008
CN      201286045 Y    8/2009
(Continued)

OTHER PUBLICATIONS

Bai Lingyun et al., Study on the loss reduction of high-efficient high-voltage series induction motors, International Conference on Electrical Machines and Systems (ICEMS), 2011, pp. 1-8, Beijing, China.
(Continued)

*Primary Examiner* — Bernard Rojas
*Assistant Examiner* — Rashad Johnson
(74) *Attorney, Agent, or Firm* — Locke Lord LLP; Tim Tingkang Xia, Esq.

(57) ABSTRACT

A mover and stator assembly of an electric machine includes at least one stator and at least one rotor. Each stator includes
(Continued)

multiple magnetic components each including a first surface and a salient portion protruding from the first surface. The rotor includes multiple second magnetic components each including a second surface and a groove located on the second surface. The first surfaces face the second surfaces, and the width of each salient portion is less than that of each groove.

31 Claims, 27 Drawing Sheets

(51) Int. Cl.
    *H02K 21/24*     (2006.01)
    *H02K 17/16*     (2006.01)
    *H02K 19/10*     (2006.01)

(58) Field of Classification Search
    USPC ......... 310/112, 114, 156.32, 156.33, 156.34,
                   310/156.53, 156.56, 156.62, 156.64, 268
    See application file for complete search history.

(56) References Cited

U.S. PATENT DOCUMENTS

| | | | | |
|---|---|---|---|---|
| 3,997,806 | A * | 12/1976 | Noto | H02K 3/00 310/237 |
| 5,777,421 | A * | 7/1998 | Woodward, Jr. | H02K 1/06 310/216.054 |
| 5,898,250 | A * | 4/1999 | Sugita | H02K 15/0012 29/596 |
| 6,870,295 | B2 * | 3/2005 | Lim | H02K 1/146 310/166 |
| 7,064,468 | B2 | 6/2006 | Fujinaka | |
| 7,550,891 | B2 | 6/2009 | Kim | |
| 7,595,574 | B2 | 9/2009 | Ritchey | |
| 7,800,276 | B2 | 9/2010 | Purvines | |
| 7,839,045 | B2 | 11/2010 | Wu et al. | |
| 7,923,887 | B2 | 4/2011 | Nakagawa | |
| 8,334,633 | B2 | 12/2012 | Hazeyama et al. | |
| 8,653,713 | B2 * | 2/2014 | Sanada | H02K 19/103 310/216.016 |
| 2012/0223610 | A1 | 9/2012 | Kalluf et al. | |
| 2013/0187488 | A1 * | 7/2013 | Sakamoto | H02K 1/06 310/44 |
| 2015/0214797 | A1 * | 7/2015 | Sakamoto | H02K 21/24 310/44 |

FOREIGN PATENT DOCUMENTS

| | | |
|---|---|---|
| CN | 100588088 C | 2/2010 |
| CN | 201699490 U | 1/2011 |
| JP | 4299391 B2 | 7/2009 |
| TW | M365597 | 9/2009 |
| TW | M401921 | 4/2011 |
| TW | M422828 | 2/2012 |

OTHER PUBLICATIONS

Subramanian Manoharan et al., Review on Efficiency Improvement in Squirrel Cage Induction Motor by Using DCR Technology, Journal of Electrical Engineering, vol. 60, No. 4, 2009, pp. 227-236.
J. L. Kirtley Jr. et al, Improving Induction Motor Efficiency with Die-cast Copper Rotor Cages, Power Engineering Society General Meeting, 2007, pp. 1-6, IEEE, Tempa, Florida, U.S.A.
Dale T. Peters et al., Die-Cast Copper Rotors as Strategy for Improving Induction Motor Efficiency, Electrical Insulation Conference and Electrical Manufacturing Expo, 2007, pp. 322-327, Nashville, Tennessee, U.S.A.
Shigeyuki Yoshihara et al., Development of Technology for Electrically Driven Powertrains in Hybrid Electric Vehicles, Industrial System, vol. 58, No. 7, Dec. 2009, pp. 325-329.
Kenji Noguchi et al., Development of Dy-free NdFeB Anisotropic Bonded Magnet (New MAGFINE), 1st International Electric Drives Production Conference (EDPC), 2011, pp. 181-186, Nuremberg, Germany.
Lijian Wu et al., A Cogging Torque Reduction Method for Surface Mounted Permanent Magnet Motor, Proceeding of International Conference on Electrical Machines and Systems, Oct. 8-11, 2007, pp. 769-773, Seoul, Korea.
Intellectual Property Office, Ministry of Economic Affairs, R.O.C., "Office Action", Taiwan, dated Mar. 6, 2015.
State Intellectual Property Office of the P. R. C, "Office Action", dated Mar. 25, 2016, China.
Design and analysis of Axial Flux Permanent Magnet Machine with a new type coreless armature, 2012.

\* cited by examiner

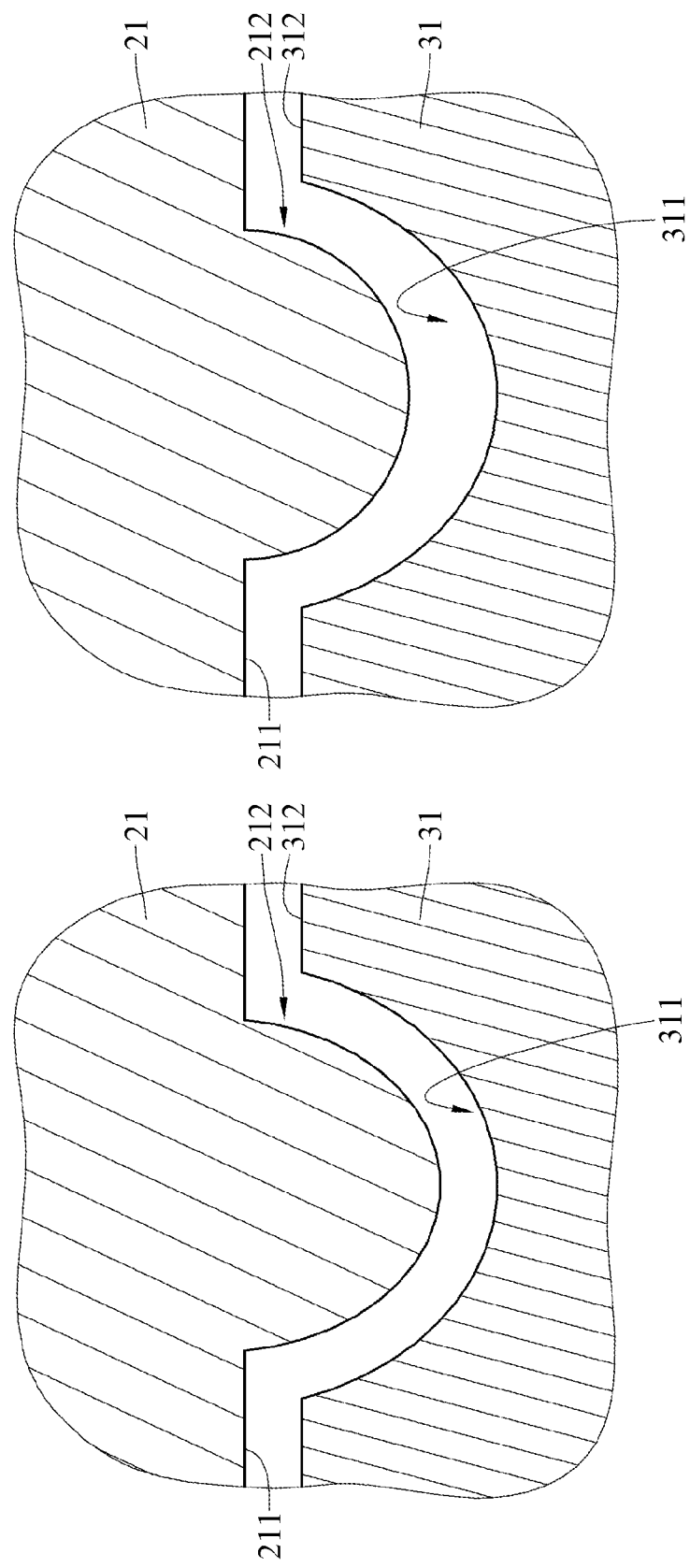

MOVER AND STATOR ASSEMBLY OF ELECTRIC MACHINE HAVING CONVEX AND CONCAVE PORTIONS FOR A RESPECTIVE STATOR AND ROTOR

CROSS-REFERENCE TO RELATED APPLICATIONS

This non-provisional application claims priority under 35 U.S.C. § 119(e) on Patent Application No. 61/817,515 filed in the United States on Apr. 30, 2013 and under 35 U.S.C. § 119(a) on Patent Application No. 102138640 filed in Taiwan, R.O.C. on Oct. 25, 2013, the entire contents of which are hereby incorporated by reference.

TECHNICAL FIELD

This disclosure relates to a mover and stator assembly of electric machine.

BACKGROUND

With the development of technology and the continuous growth of population in today's world, the demand for energy is certainly getting higher. In addition, with the heavy consumption of non-renewable energy, the cost for energy is getting higher as well. Therefore, in order to achieve energy saving and reduce energy cost, many countries have started to more strictly limit the usage of energy in many aspects. To reduce energy usage in factories, many laws and policies are established to encourage all the companies to increase their efficiency on production. As for motors which are usually responsible for more than 70% of total energy usage in factories, manufacturers are also trying to achieve better efficiency on them. Considering the many types of motor structures, the most common one is the induction motor. Furthermore, permanent-magnet motor and reluctance motor are also popular because of their simple structures, easiness to repair, and high efficiency.

For induction motors, the primary way of enhancing the efficiency is to reduce the internal energy loss. The internal energy loss can be divided into five categories, including iron loss, rotor and stator's resistance loss, air loss, friction loss, and stray loss. To reduce the rotor and stator's resistance loss, one of the main focuses of development is to use copper as the material for the rotor. For permanent-magnet motor, the magnet plays a big role in the motor's performance. Especially with the development seeking high efficiency, portability, and high torque density nowadays, the development not only focuses on increasing the magnetic energy product of the magnet, but also tries to reduce magnetic loss and effectively guide the magnetic circuit. In the designs of mover and stator in traditional machines, due to the limitation of the shape of the magnet and the stamping process of the silicon-steel sheet, the surface magnetic field is usually higher at the edges of the magnet. Furthermore, normal structures of mover and stator are made of silicon-steel sheet and rare earth magnet (for example: Dysprosium). The cost of rare earth material and manufacturing module for manufacturing permanent-magnet is relatively high, so the total cost of the entire manufacturing process becomes even higher.

Therefore, there is a need for a mover and stator assembly of electric machine that can increase the efficiency, reduce energy loss, and reduce the manufacturing cost.

SUMMARY

According to an embodiment, a mover and stator assembly of electric machine comprises at least one stator and at least one rotor. Each of the at least one stator comprises a plurality of first magnetic parts, and each of the first magnetic parts comprises a first surface and a convex part protruding from the first surface. Each of the at least one rotor comprises a plurality of second magnetic parts, and each of the second magnetic parts comprises a second surface and a concave part set up at the second surface. The first surface and the second surface face each other. The width of each of the convex parts is smaller than the width of each of the concave parts.

According to an embodiment, a mover and stator assembly of electric machine comprises at least one stator and at least one rotor. Each of the stators comprises a plurality of first magnetic parts, and each of the first magnetic parts comprises a first surface and a concave part set up at the first surface. Each of the rotors comprises a plurality of second magnetic parts, and each of the second magnetic parts comprises a second surface and a convex part protruding from the second surface. The first surface and the second surface face each other. The width of each of the convex parts is smaller than the width of each of the concave parts.

According to an embodiment, a mover and stator assembly of electric machine comprises a stator and a moving part. The stator comprises a first magnetic part which further comprises a first surface and a convex part protruding from the first surface. The moving part comprises a second magnetic part which further comprises a second surface and a concave part set up at the second surface. The first surface and the second surface face each other. The width of the convex part is smaller than the width of the concave part. The convex part and the concave part are set up along the moving direction of the moving part.

According to an embodiment, a mover and stator assembly of electric machine comprises a stator and a moving part. The stator comprises a first magnetic part which further comprises a first surface and a concave part set up at the first surface. The moving part comprises a second magnetic part which further comprises a second surface and a convex part protruding from the second surface. The first surface and the second surface face each other. The width of the convex part is smaller than the width of the concave part. The convex part and the concave part are set up along the moving direction of the moving part.

BRIEF DESCRIPTION OF THE DRAWINGS

FIGS. 9A, 9B, 9C, 9D, 9E, 9F, and 10 are cutaway diagrams of an example convex part and an example concave part in an embodiment.

DETAILED DESCRIPTION

Figure 1:
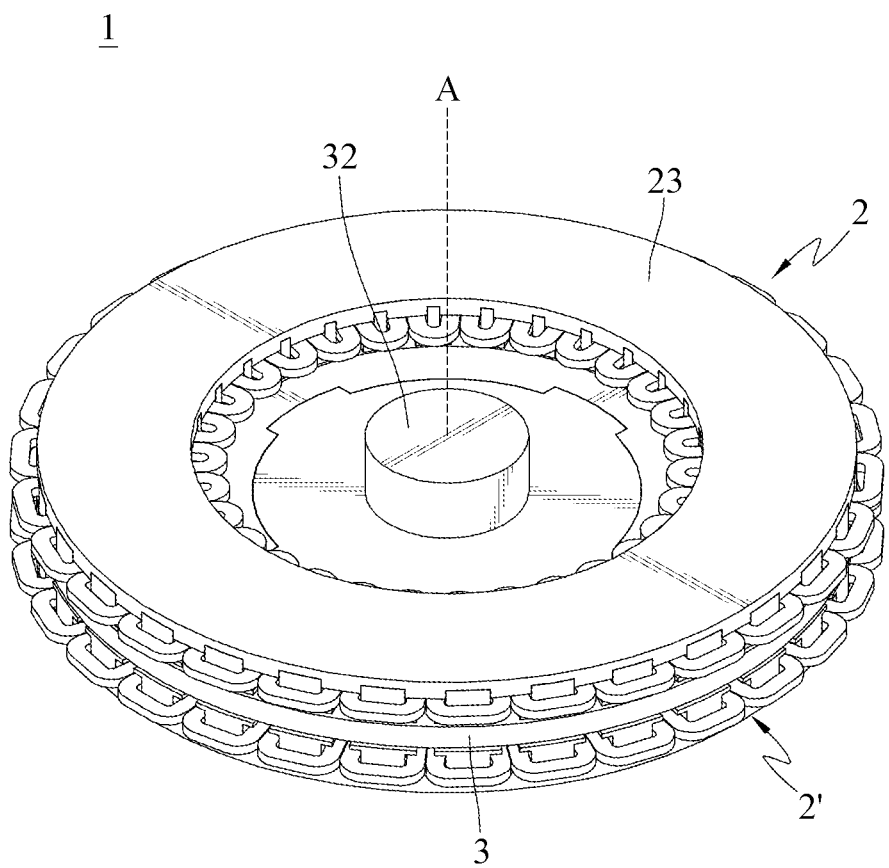
FIG. 1 is a perspective view of an example mover and stator assembly of electric machine in an embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The disclosure herein provides a mover and stator assembly of electric machine used for receiving electric energy. Through electromagnetic effects, the mover may move or rotate along the stator to generate mechanical energy. The mover may be a rotor which rotates relatively to the stator; the mover may also be a moving part which moves linearly relatively to the stator. Furthermore, electric machine may be induction motor, reluctance motor, permanent-magnet brushless motor, and linear moving assembly. However, the application of the mover and stator assembly herein does not have any limitations on the disclosure.

Figure 2:
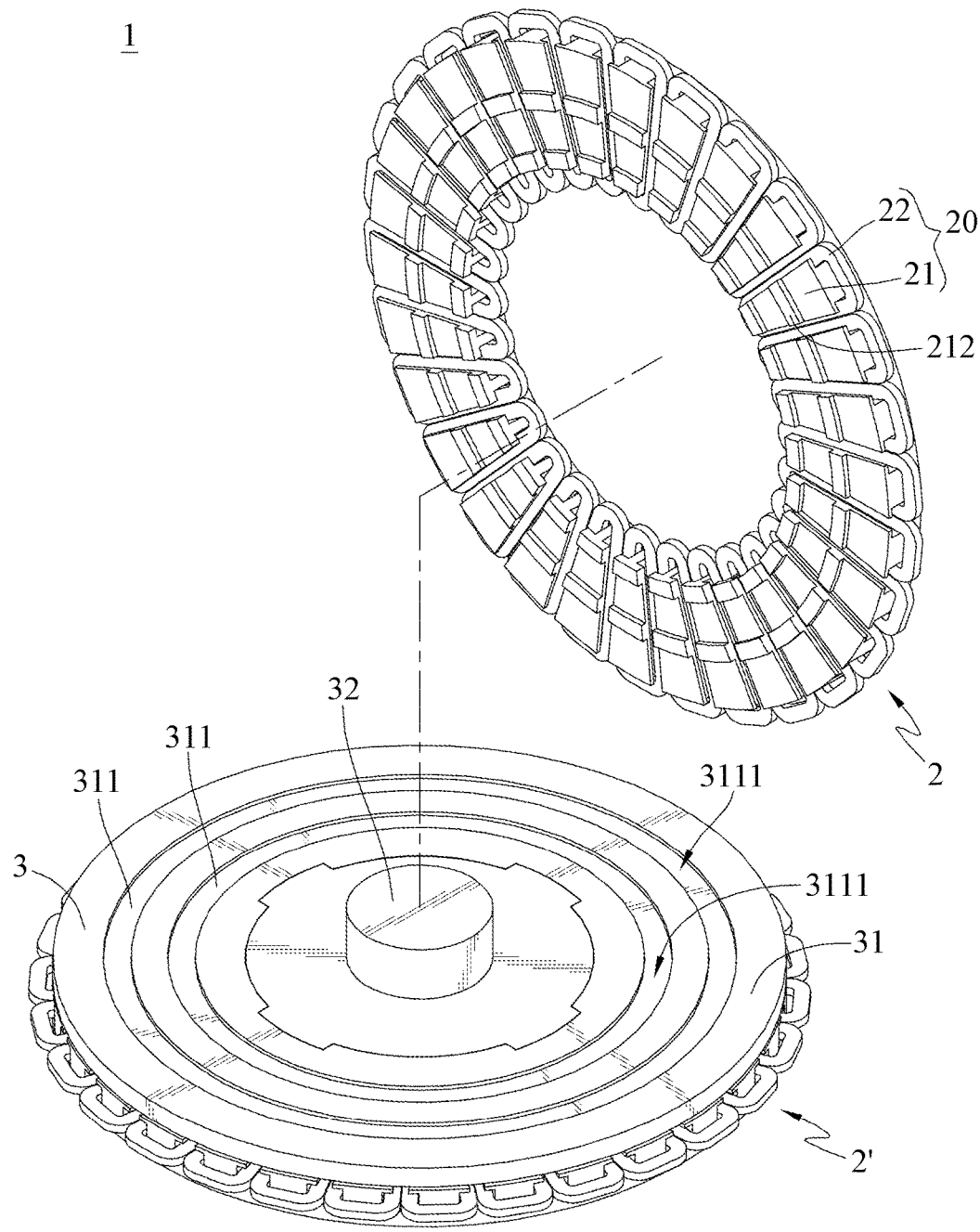
FIG. 2 is a perspective exploded diagram of the example mover and stator assembly of electric machine in an embodiment.
Figure 3:
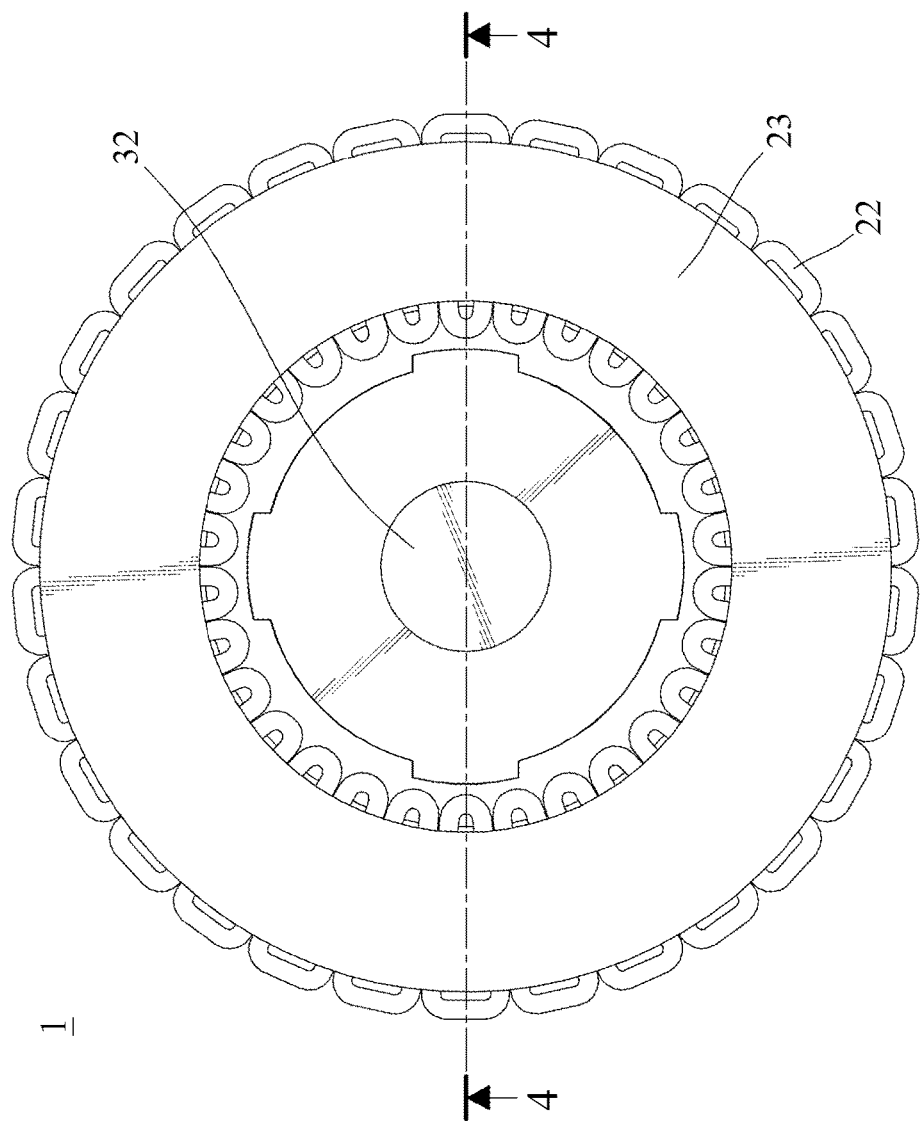
FIG. 3 is a top view diagram of the example mover and stator assembly of electric machine in an embodiment.

Referring to FIG. 1, FIG. 2, and FIG. 3, FIG. 1 is a perspective of an example mover and stator assembly of electric machine in an embodiment. FIG. 2 is a perspective exploded diagram of the example mover and stator assembly of electric machine in an embodiment. FIG. 3 is a top view diagram of the example mover and stator assembly of electric machine in an embodiment. According to the embodiment, the mover and stator assembly of electric machine 1 is a rotor and stator assembly comprising two stators 2, 2' and one rotor 3. The rotor 3 is between the two stators 2, 2' and rotates relatively to the two stators 2, 2'. In the embodiment, the rotor and stator assembly is applied to axial electric motor.

Figure 4:
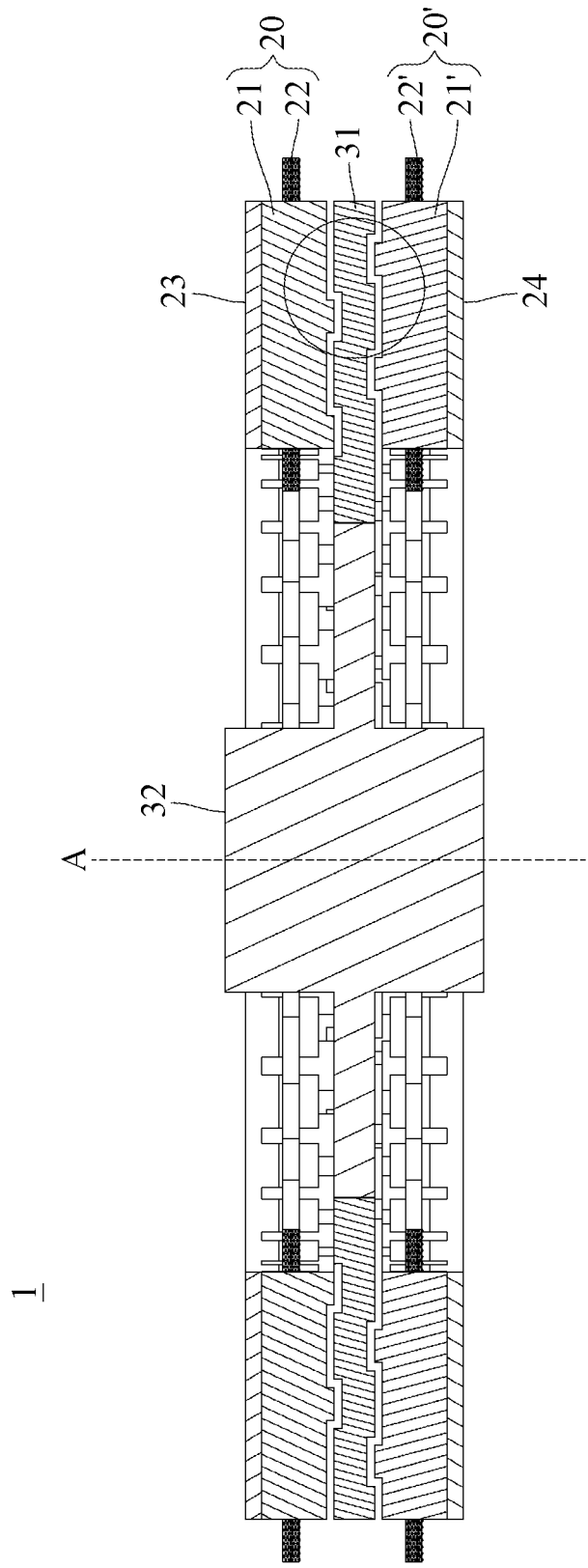
FIG. 4 is a cutaway diagram of FIG. 3 along the line 4-4.
Figure 5A:
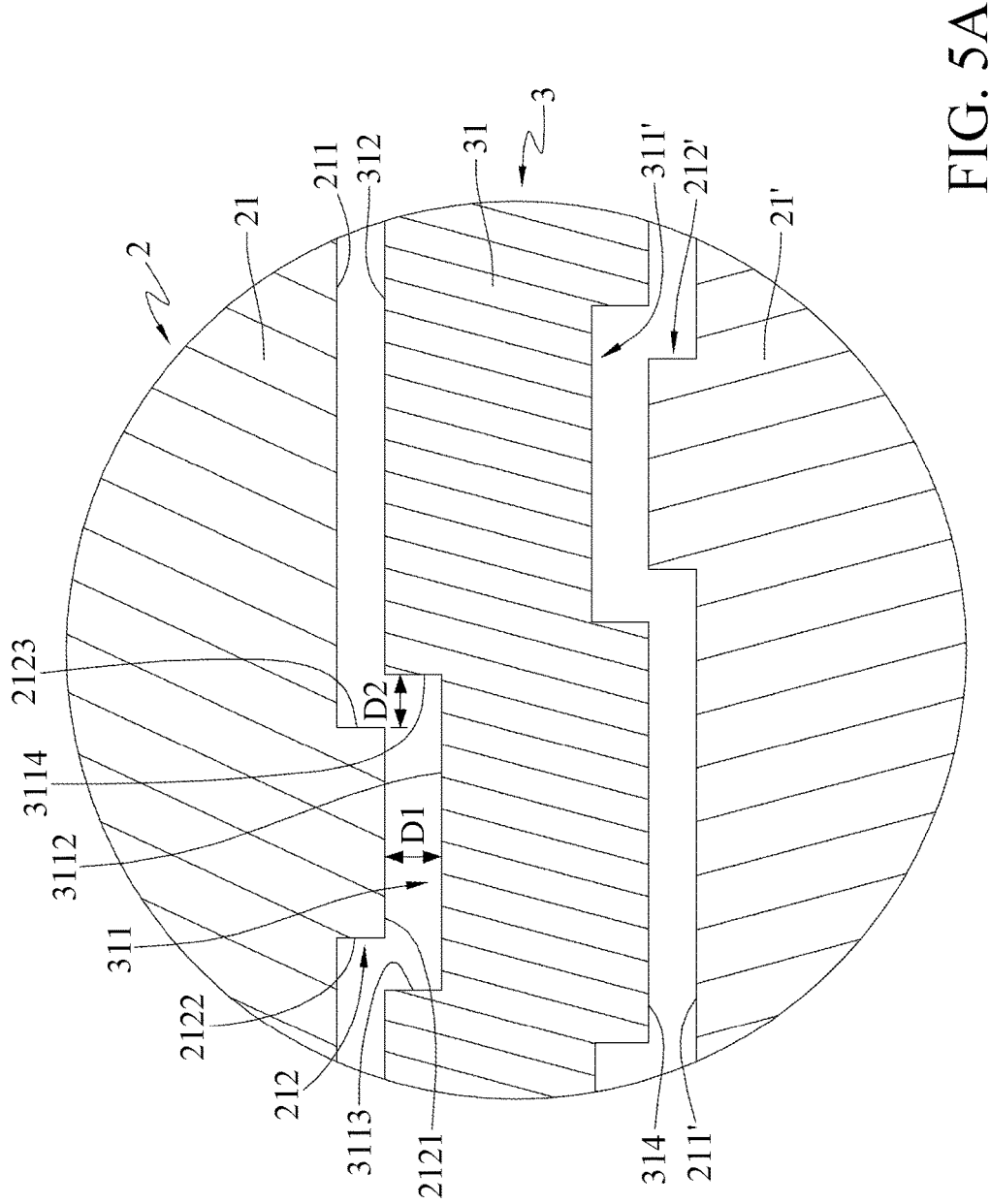
FIG. 5A is a partial enlarged cutaway diagram of the example mover and stator assembly of electric machine in FIG. 4.

Referring to FIG. 1, FIG. 2, FIG. 3, FIG. 4, and FIG. 5A, FIG. 4 is a cutaway diagram of FIG. 3 along the line 4-4. FIG. 5A is a partial enlarged cutaway diagram of the example mover and stator assembly of electric machine in FIG. 4. For example, Stator 2 comprises several first magnetic parts 20 and a first shell 23. The first magnetic parts 20 form a circular structure with the rotation axis A of the rotor 3 being the center of the circle. Each of the first magnetic parts 20 has a first surface 211 and two convex parts 212 protruding from the first surface 211. All of the first surfaces 211 face the same direction and the convex parts 212 are placed along the circular direction of the rotation axis A to form two circular troughs. In the embodiment, the normal vector of the first surface 211 is parallel to the rotation axis A. Similarly, stator 2' comprises several first magnetic parts 20' and a second shell 24. In this embodiment, first magnetic part 20, 20' each comprises a magnetic conductive part 21, 21' and a solenoid 22, 22'. Solenoid 22, 22' each coils around the magnetic conductive parts 21, 21' and the magnetic conductive parts 21, 21' each has the first surface 211, 211' and the convex parts 212, 212' set up at the first surface 211, 211', as described above. In other words, the first magnetic parts 20, 20' may be electromagnet. Also, the number of the convex part 212 and concave part 311 described herein do not have any limitation on the disclosure. In other embodiments, the number of the convex part 212 and concave part 311 may be one or greater than two.

The structure of rotor 3 is illustrated below. The rotor 3 comprises several second magnetic parts 31 surrounding a rotation shaft 32. Each of the second magnetic parts 31 has a second surface 312, a third surface 314, two concave parts 311 set up at the second surface 312, and two concave parts 311' set up at the third surface 314. The second surface 312 and the third surface 314 are located on the opposite sides of the rotor 3. The second surfaces 312 of the second magnetic parts all face the first surfaces 211 of the magnetic conductive parts 21, and the third surfaces 314 all face the first surfaces 211' of the magnetic conductive parts 21'. In this embodiment and some other embodiments, the normal vector of the first surface 211 towards the second surface 312 and the normal vector of the first surface 211' towards the third surface 314 are both parallel to the rotation axis A of the rotor 3. Moreover, the concave parts 311 are placed along the circular direction of the rotor 3 with the rotation axis A being the center of circle to form a circular trough 3111. When the rotor 3 rotates relatively to stator 2, the concave parts 311 may rotate relatively to the convex parts 212 and the projections of the convex parts 212 to the rotor 3 in the direction parallel to the rotation axis A all lie inside the circular trough 3111. Referring to FIG. 5A, the width of each of the convex parts 212 is smaller than the width of each of the concave parts 311. Each of the concave parts 311 has a bottom surface 3112 and a first side-wall 3113 facing a second side-wall 3114. Each of the convex parts 212 has a top surface 2121 and a first side-part 2122 facing a second side-part 2123. The bottom surface 3112 of each of the concave parts 311 faces the top surface 2121 of each of the corresponding convex parts 212. The first side-wall 3113 and the second side-wall 3114 each connects with the corresponding side of the bottom surface 3112, and the first side-part 2122 and the second side-part 2123 each connects with the corresponding side of the top surface 2121. The first side-wall 3113 corresponds to the first side-part 2122 and the second side-wall 3114 corresponds to the second side-part 2123. Therefore, the shape of cross-section of the convex parts 212 and the concave parts 311 in FIG. 5A is rectangle. In this embodiment, the concave parts 311 may rotate along the circular convex trough composed by the corresponding convex parts 212. Furthermore, there is a perpendicular distance D1 between the bottom surface 3112 and the top surface 2121. There is also a perpendicular distance D2 between the first side-part 2122 and the first side-wall 3113 and between the second side-part 2123 and the second side-wall 3114. In this embodiment, the perpendicular distance D1 equals to the perpendicular distance D2. However, in other embodiments, the perpendicular distance D1 may not equal to the perpendicular distance D2. Also, in this embodiment, the convex parts 212 do not fall into the space of concave parts 311, which is the space between the top surface 2121 at the second surface 312 and the bottom surface 3112.

Figure 5B:
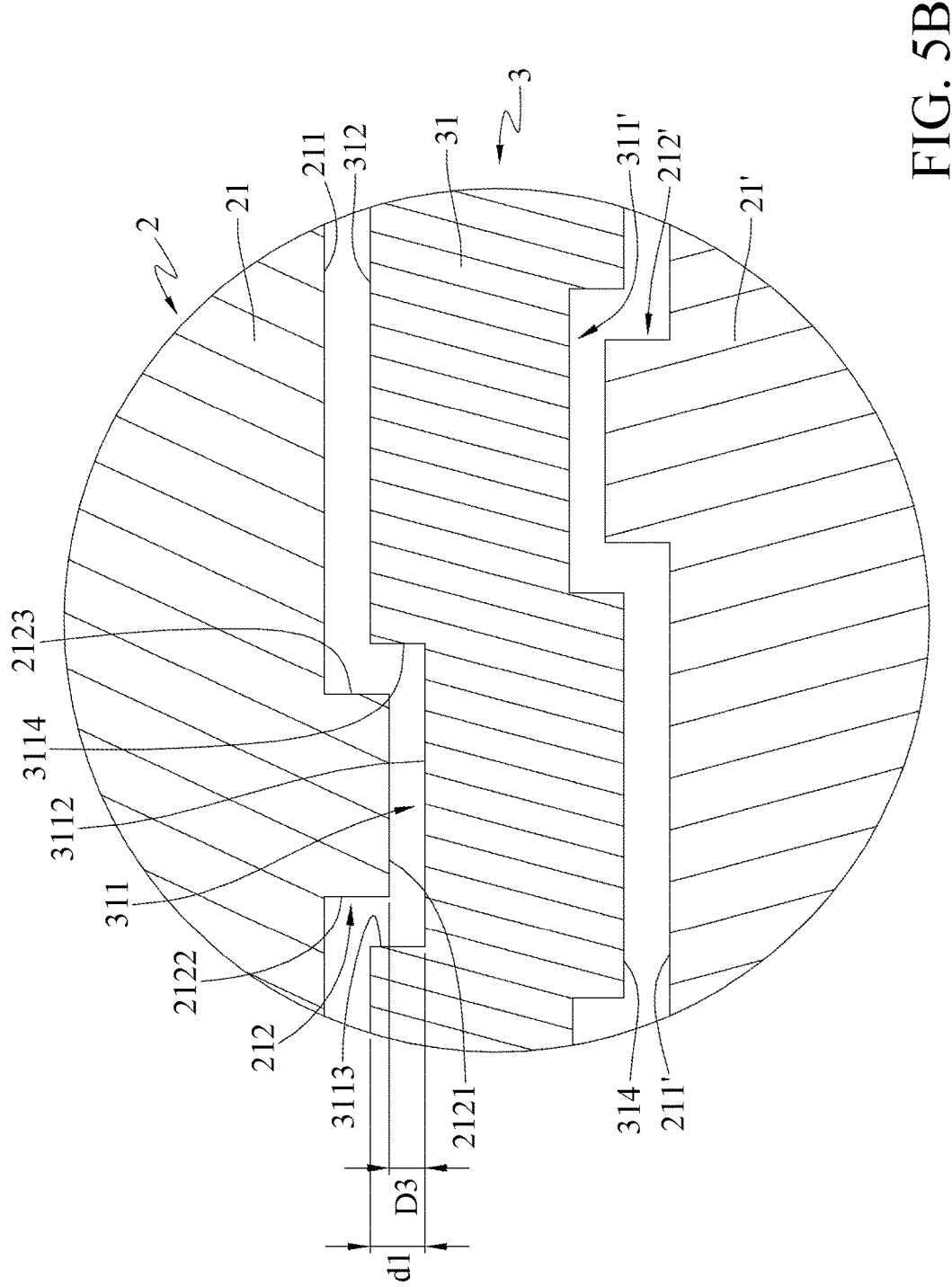
FIG. 5B is a partial enlarged cutaway diagram of an example mover and stator assembly of electric machine in an embodiment.

However, the convex parts 212 not falling into the space of concave parts 311 does not try to have any limitation on the disclosure. Please refer to FIG. 5B, which is a partial enlarged cutaway diagram of an example mover and stator assembly of electric machine in an embodiment. In this embodiment, the convex parts 212 do fall into the space of the concave parts 311 formed by the bottom surface 3112, the first side-wall 3113, and the second side-wall 3114. In other words, the perpendicular distance D3 from the bottom surface 3112 of the concave parts 311 to the top surface 2121 of the convex parts 212 is smaller than the depth D1 of the concave parts 311.

Referring to FIG. 4 and FIG. 5A, concave parts 311, 311' each faces convex parts 212, 212', wherein the distances from the rotation shaft 32 to concave parts 311 and concave parts 311' are different. Similarly, the distances from the rotation shaft 32 to convex parts 212 and convex parts 212' are different. In other words, the corresponding formation of the concave parts 311, 311' and the convex parts 212, 212' is separately set up according to the radial direction of the rotation shaft 32.

In this disclosure, each of the second magnetic parts 31 may be a permanent magnet or a magnetic conductive part. When the second magnetic part 31 is a magnetic conductive part, the magnetic conductive part is silicon-steel sheet. Or the material of the magnetic conductive part is soft magnetic composite (SMC) material.

Figure 6:
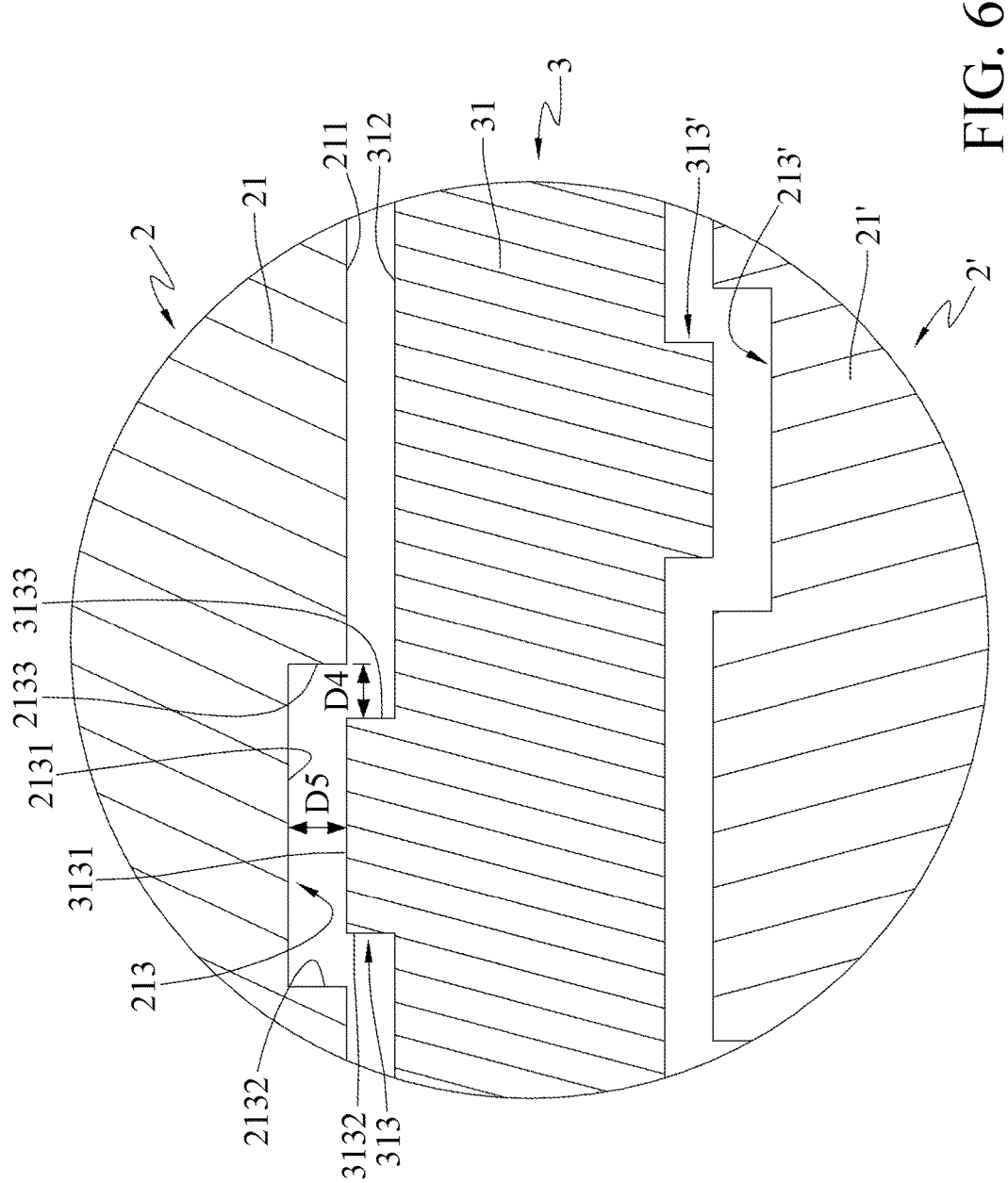
FIG. 6 is a partial enlarged cutaway diagram of an example mover and stator assembly of electric machine in an embodiment.

In the above embodiment, the stator 2 disclosed has convex parts 212 and the rotor 3 disclosed has concave parts 311, However, in other embodiments, the stator 2 may have concave parts and the rotor 3 may have convex parts. Please refer to FIG. 6, which is a partial enlarged cutaway diagram of an example mover and stator assembly of electric machine in an embodiment. Stator 2, 2' each has concave parts 213, 213' and rotor 3 has convex parts 313, 313' locating on the opposite sides respectively. Concave parts 213, 213' each face convex parts 313, 313'. For example, the concave part 213 has a bottom surface 2131, a first side-wall 2132, and a second side-wall 2133. The convex part 313 has a top surface 3131, a first side-part 3132, and a second side-part 3133. The top surface 3131 faces the bottom surface 2131, and the first side-wall 2132 and the second side-wall 2133 corresponds to the first side-part 3132 and the second side-part 3133 respectively. The distance between the first side-wall 2132 and the second side-wall 2133 and the distance between the first side-part 3132 and the second side-part 3133 both equal to perpendicular distance D4. The distance between the top surface 3131 and the bottom surface 2131 equals to perpendicular distance D5. Perpendicular distance D4 may be equal to, smaller, or bigger than perpendicular distance D5.

In the above embodiments, the method of placing rotor 3 between two stators 2, 2' does not try to have any limitations on the disclosure. Please refer to FIG. 7, which is a partial cutaway diagram of an example mover and stator assembly of electric machine in an embodiment. This embodiment is similar to the embodiment described above. In this embodiment, the mover and stator assembly of electric machine 1 only comprises a stator 2 and a rotor 3. The stator 2 comprises a magnetic conductive part 21 and a first shell 23. The stator 2 is located on one side of the rotor 3, which means the rotor 3 is on the opposite side of the first shell 23. Moreover, the magnetic conductive part 21 has two convex parts 212 and the rotor 3 has two concave parts 313. The two convex parts 212 and the two concave parts 313 face each other respectively. Thus, when the rotor 3 rotates relatively to the stator 2, the concave parts rotates relatively to the convex parts 212 as well, thereby achieving the increase of rotation torque.

Figure 7:
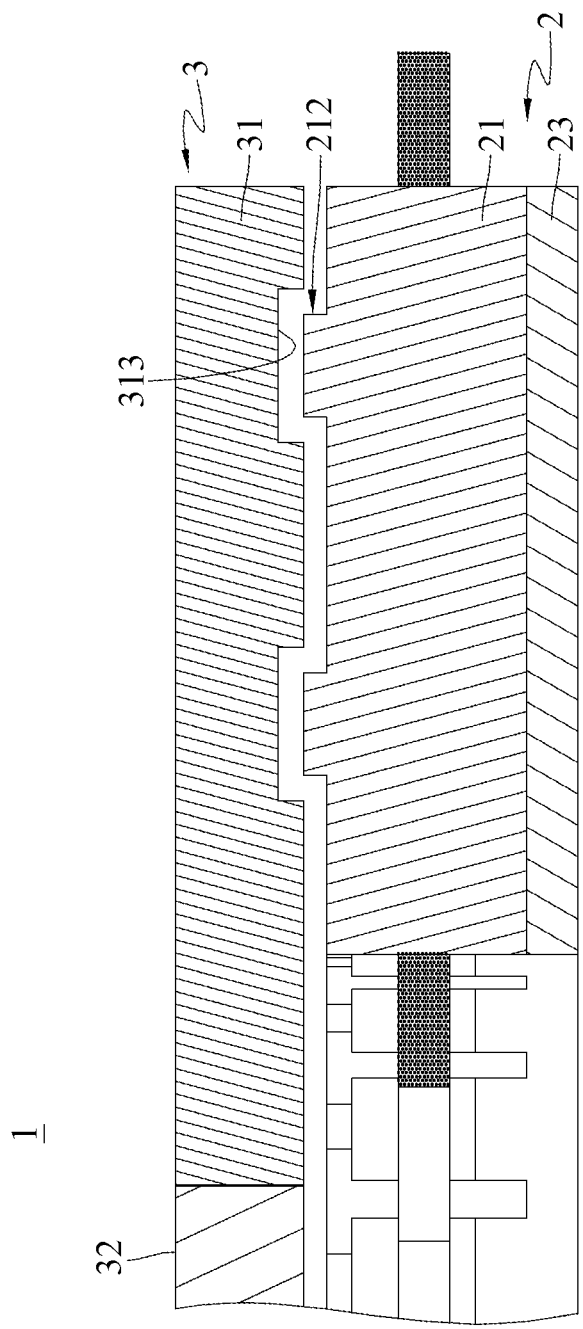
FIG. 7 is a partial cutaway diagram of an example mover and stator assembly of electric machine in an embodiment.
Figure 8A:
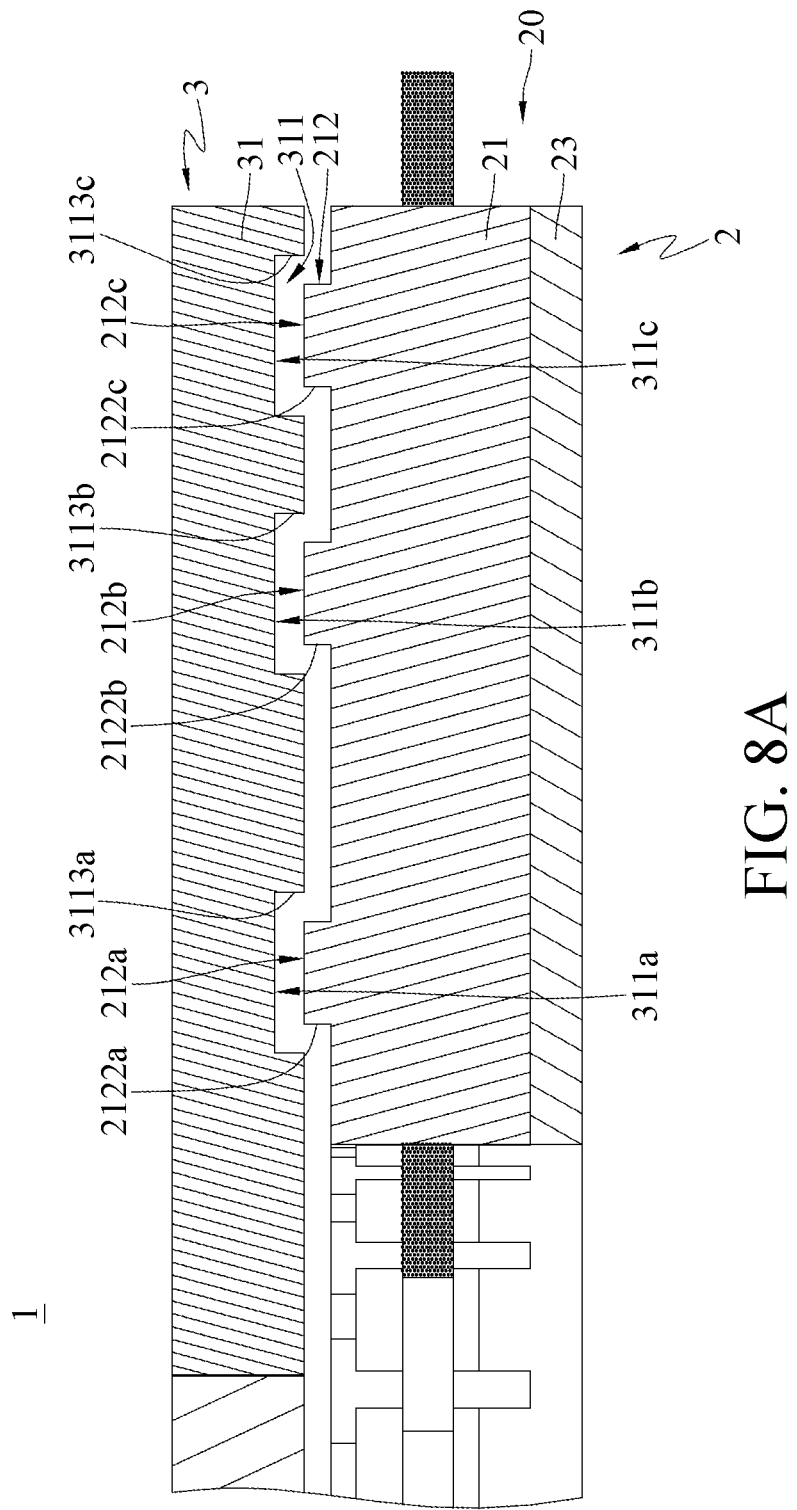
FIGS. 8A and 8B are partial cutaway diagrams of an example mover and stator assembly of electric machine in an embodiment.

The illustration below has several convex and concave parts with different gaps in between. Please refer to FIG. 8A, which is a partial cutaway diagram of an example mover and stator assembly of electric machine in an embodiment. The embodiment in FIG. 8A is similar to the embodiment in FIG. 7. In this embodiment, the first magnetic part 20 of the stator 2 has several convex parts 212. The convex parts 212 comprise a first convex part 212a, a second convex part 212b, and a third convex part 212c placed in the outward direction of the rotation axis A of the rotor 3 accordingly. The distance from the first convex part 212a to the second convex part 212b is different from the distance from the second convex part 212b to the third convex part 212c. The second magnetic part 31 of the rotor 3 has several concave parts 311. The concave parts 311 comprise a first concave part 311a, a second concave part 311b, and a third concave part 311c placed in the outward direction of the rotation axis A of the rotor 3 accordingly. The distance from the first concave part 311a to the second concave part 311b is different from the distance from the second concave part 311b to the third concave 311c. In this embodiment, the first convex part 212a, the second convex part 213b, and the third convex part 212c have three first side-parts 2122a, 2122b, and 2122c respectively. The first side-parts 2122a, 2122b, and 2122c all face the rotation axis (on the left side of the figure). The distance between the first side-parts 2122a, 2122b and the distance between the first side-parts 2122a, 2122c are different. Moreover, the first concave part 311a, the second concave part 311b, and the third concave part 311c have three first side-walls 3113a, 3113b, and 3113c. The first side-walls 3113a, 3113b, and 3113c all face the rotation axis. The distance between the first side-walls 3113a, 3113b and the distance between the first side-walls 3113b, 3113c are different. However, in other embodiments, the distance from the first convex part 212a to the second convex part 212b equals to the distance from the second convex part 212b to the third convex part 212c; the distance from the first concave part 311a to the second concave part 311b may also equal to the distance from the second concave part 311b to the third concave part 311c. Therefore, when the rotor 3 rotates relatively to the stator 2, the first concave part 311a, the second concave part 311b, and the third concave part 311c also rotate relatively to the first convex part 212a, the second convex part 212b, and the third convex part 212c respectively, thereby achieving the increase of rotation torque.

Figure 8B:
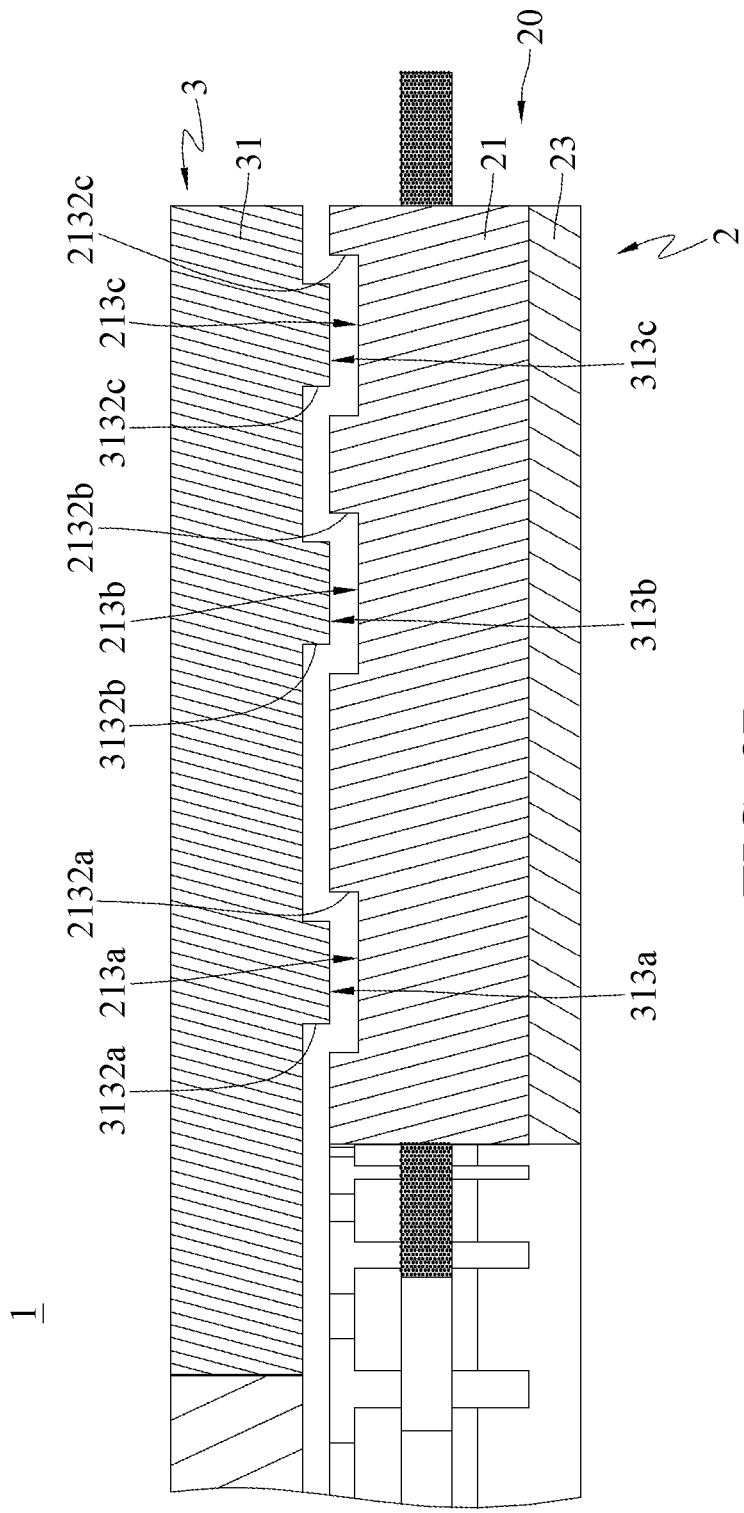

The gaps between the several concave parts of the stator 2 and the several convex parts of the rotor 3 are not the same. Please refer to FIG. 8B, which is a partial cutaway diagram of an example mover and stator assembly of electric machine in an embodiment. This embodiment is similar to the embodiment in FIG. 6. In this embodiment, the magnetic conductive part 21 of the first magnetic part of the stator 2 has a first concave part 213a, a second concave part 213b, and a third concave part 213c. The first concave part 213a, the second concave part 213b, and the third concave part 213c have a first side-wall 2132a, 2132b, and 2132c respectively. Rotor 3 has a first convex part 313a, a second convex part 313b, and a third convex part 313c. The first convex part 313a, the second convex part 313b, and the third convex part 313c have a side-part 3132a, 3132b, and 3132c respectively. In this embodiment, the distance between the first concave part 213a and the second concave part 213b is different from the distance between the second concave part 213b and the third concave part 213c, so the distance between the first side-walls 2132a, 2132b is also different from the distance between the first side-walls 2132b, 2132c. Similarly, the distance between the first convex part 313a and the second convex part 313b is different from the distance between the second convex part 313b and the third convex part 313c, so the distance between the first side-parts 3132a, 3132b is different from the distance between the first side-parts 3132b, 3132c. In other embodiments, the distance between the first concave part 213a and the second concave part 213b may equal to the distance between the second concave part 213b and the third concave part 213c; the distance between the first convex part 313a and the second convex part 313b may also equal to the distance between the second convex part 313b and the third convex part 313c.

Figure 9A:
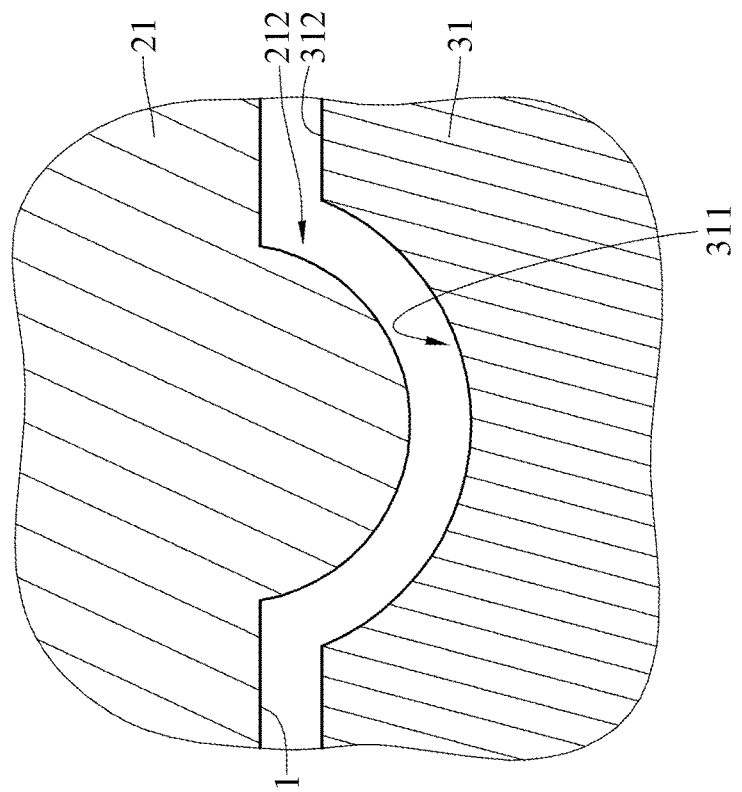
Figure 9B:
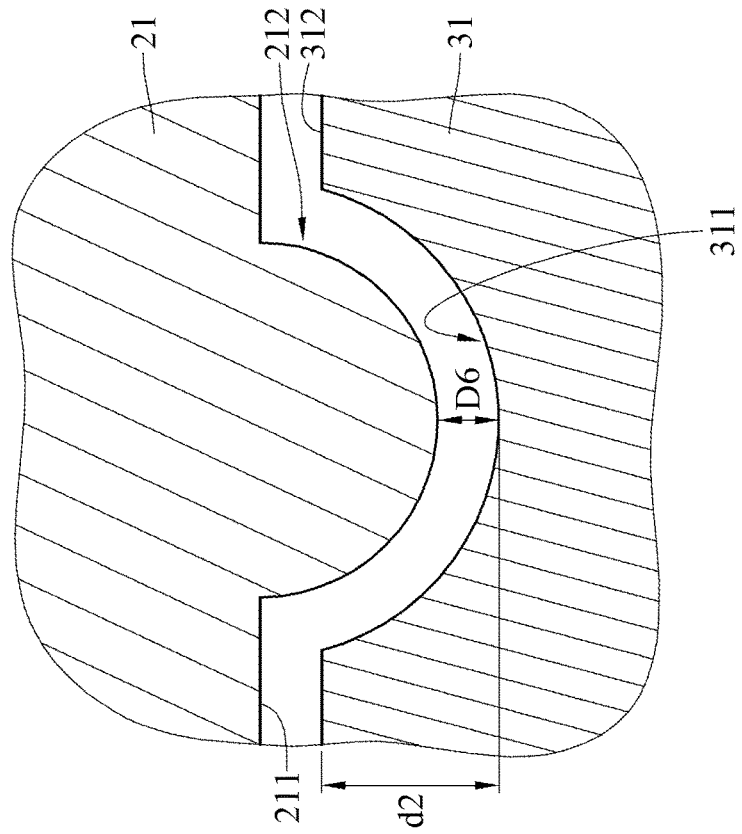
Figure 9F:
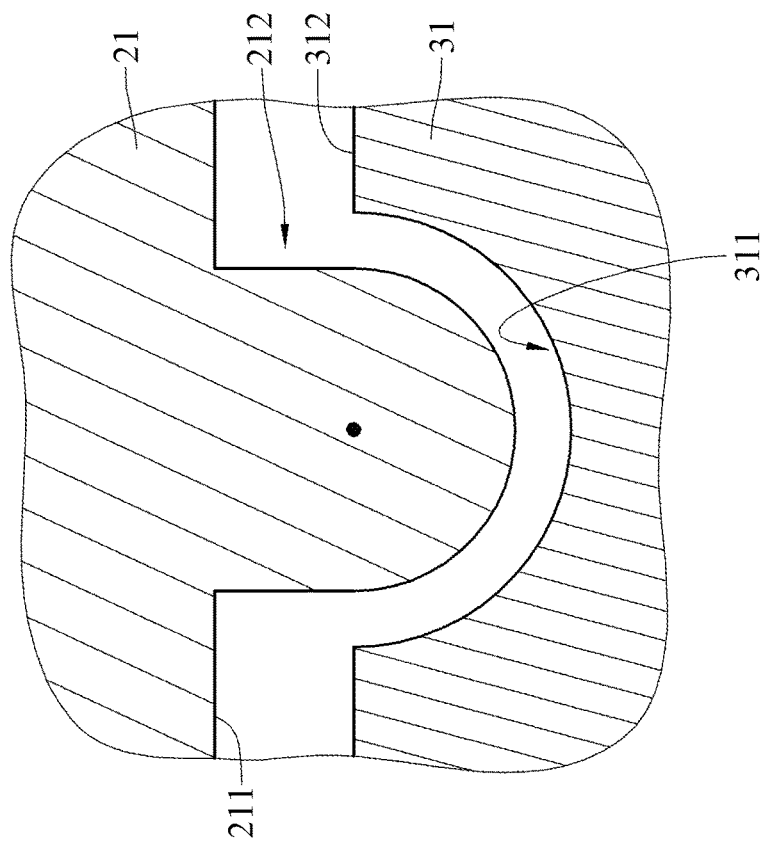
Figure 9E:
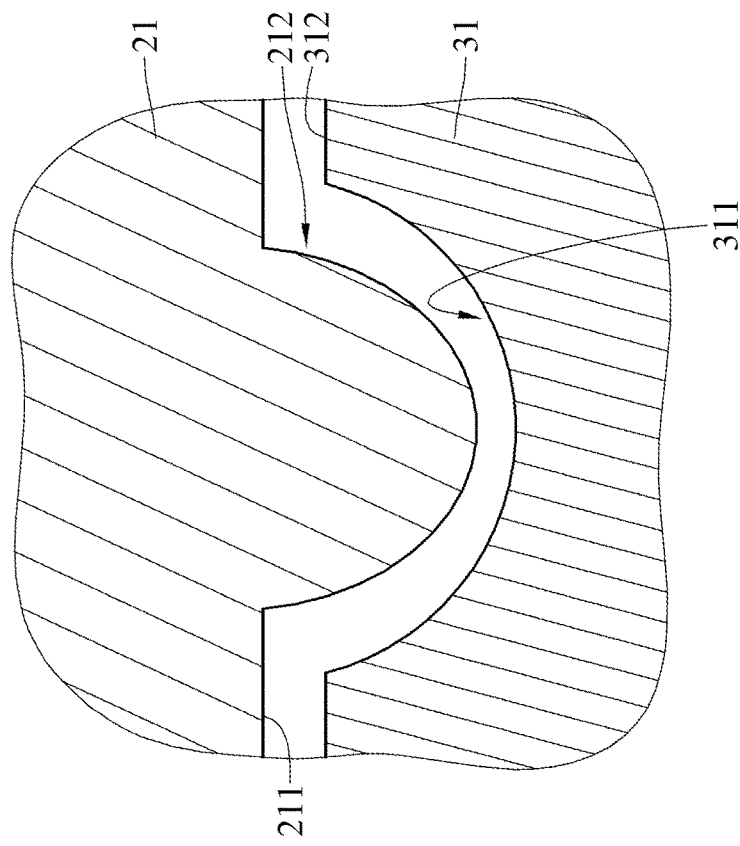
Figure 10:
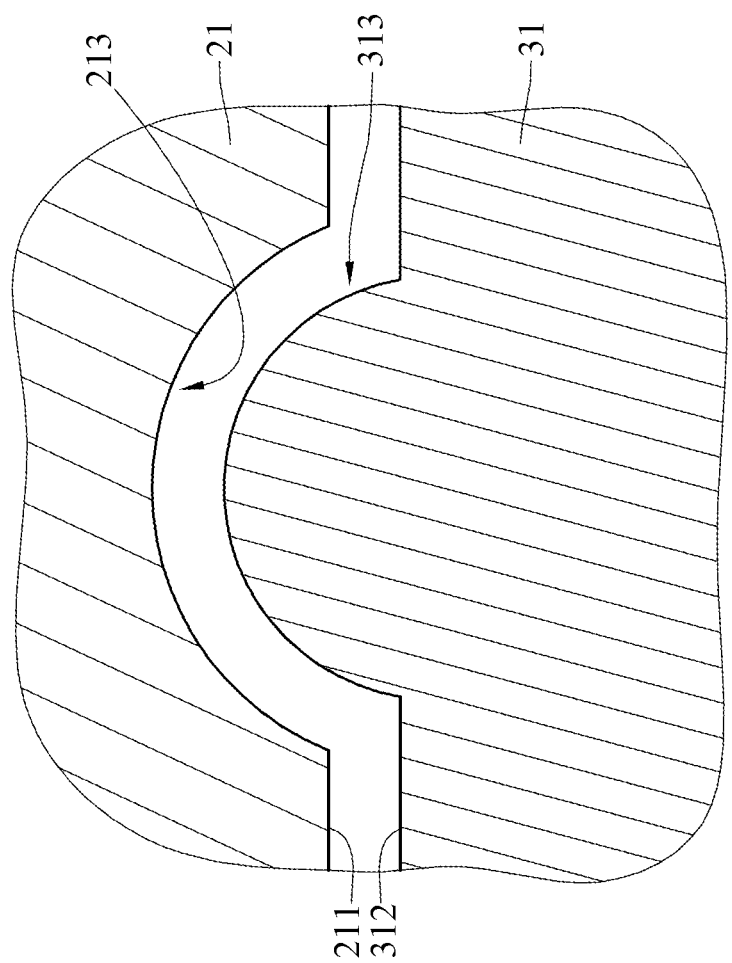

The cross-sectional shape of the convex and concave parts described above is rectangle, but it does not intend to have any limitations on the disclosure and may be modified accordingly. FIGS. 9A, 9B, 9C, 9D, 9E, 9F, and 10 are cutaway diagrams of an example convex part and an example concave part in an embodiment. In FIG. 9A, the cross-sectional shape of convex parts 212 is a semicircle, and the cross-sectional shape of the concave part 311 is a circular arc (the area is smaller than semicircle). The center of circle of the convex parts 212 and the concave parts 311 are located on the extended surface of the first surface 211, so the convex parts 212 and the concave parts 311 have the same center of circle. Moreover, the perpendicular distance D6 of the convex parts 212 and the concave parts 311 is smaller than the depth d2 of the concave parts 311, so part of the volume of the convex parts 212 are inside the concave parts 311. In FIG. 9B, the cross-sectional shape of the convex part 212 is a circular arc, and the cross-sectional shape of the concave part 311 is also a circular arc. The centers of circle of the convex parts 212 are located inside the first magnetic parts, and the centers of circle of the concave parts 311 are located on the extended surface of the first surface 211. Thus, the center of circle of the convex parts 212 and the concave parts 311 are different in location. In FIG. 9C, the cross-sectional shapes of the convex parts 212 and the concave parts 311 are both oval shapes. In FIG. 9D, the cross-sectional shape of the convex part 212 is a semicircle, and the cross-sectional shape of the concave part is an oval shape. In FIG. 9E, the cross-sectional shape of the convex part 212 is an oval shape, and the cross-sectional shape of the concave part 311 is a circular arc. The center of circle of the concave parts 311 is located on the extended surface of the first surface 211. In FIG. 9F, the cross-sectional shape of the convex part 212 is a cylinder, and the cross-sectional shape of the concave part 311 is a semicircle. The center of circle of the concave parts 311 is located at the same location of the center of circle of the cylinder. Moreover, in other embodiments, when the magnetic conductive part 21 has concave part 213 and the second magnetic part 31 has convex part 313, the cross-sectional shapes of concave part 213 and convex part 313 may be the shapes described above in FIGS. 9A, 9B, 9C, 9D, 9E, and 9F. For example, in FIG. 10, the cross-sectional shape of the concave part 213 is an oval shape, and the cross-sectional shape of the convex part 313 is a semicircle. Therefore, the cross-sectional shapes of the convex parts and concave parts described above may be semicircle, oval shape, circular arc, cylinder, or other shapes. The center of circle of convex part and concave part or the length of the cylinder may be modified accordingly.

Figure 11A:
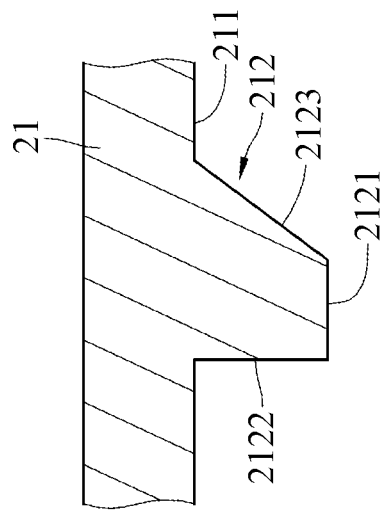
FIGS. 11A, 11B, 11C, 11D, 11E, and 11F are cutaway diagrams of an example convex part in an embodiment.
Figure 11B:
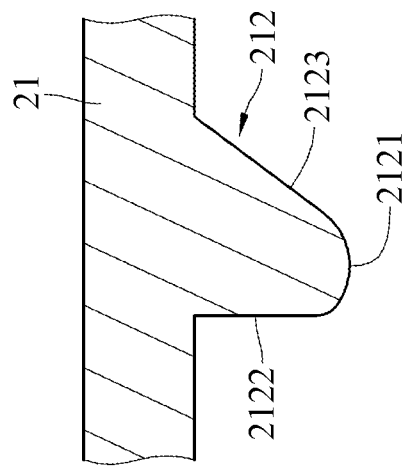
Figure 11C:
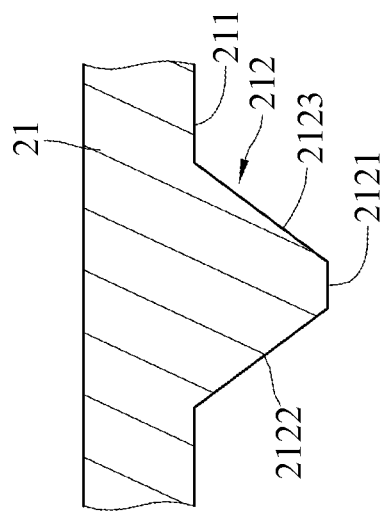
Figure 11D:
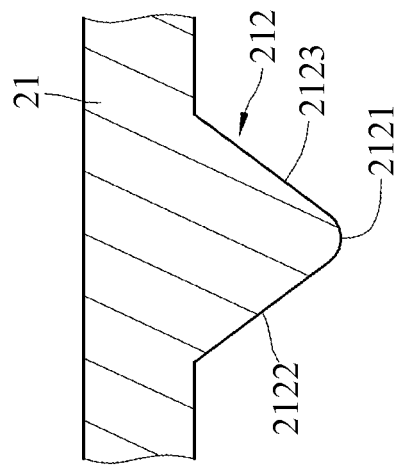
Figure 11E:
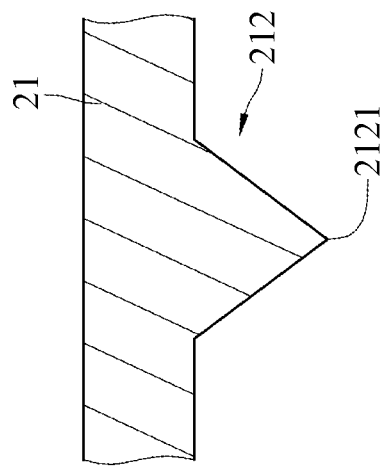
Figure 11F:
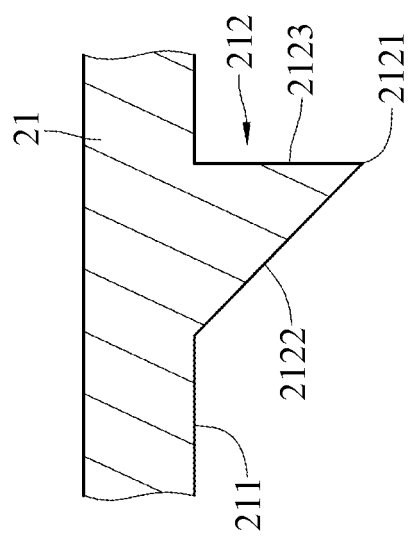
Figure 12:
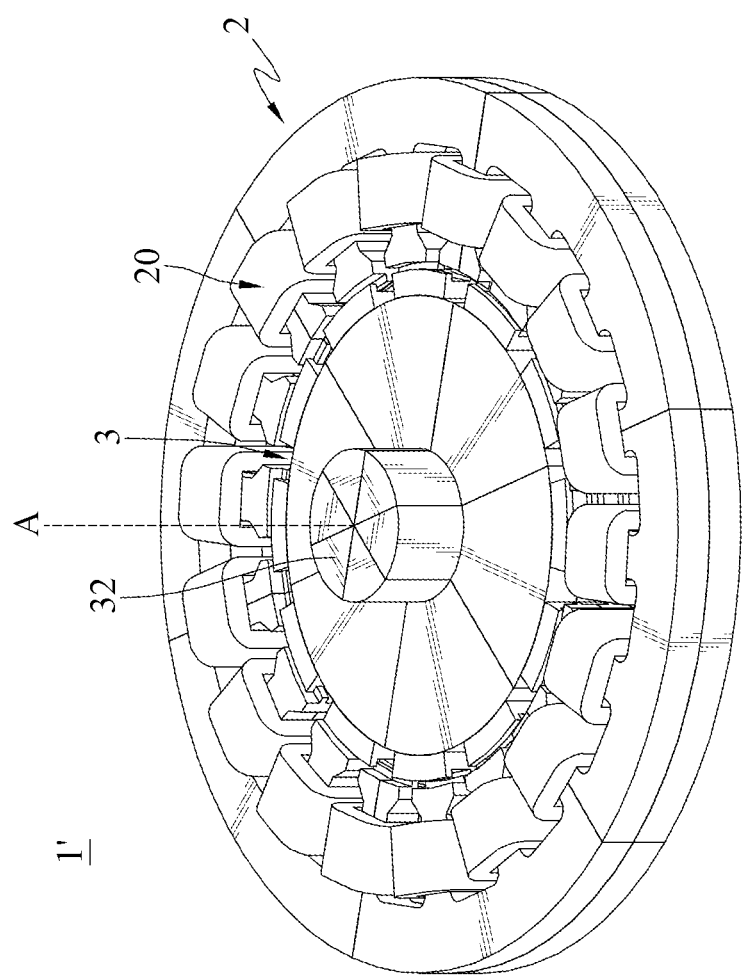
FIG. 12 is a perspective view of an example mover and stator assembly of electric machine in an embodiment.

FIGS. 11A, 11B, 11C, 11D, 11E, and 11F are cutaway diagrams of an example convex part in an embodiment. The cross-sectional shape of convex part is not limited to be the shapes described above. In FIG. 11A, the cross-sectional shape of the convex part 212 is an isosceles triangle and the top surface 2121 is the vertex of an acute angle. In FIG. 11B, the cross-sectional shape of the convex part 212 is a right triangle, so the surface of the second side-part 2123 is perpendicular to the first surface 211 and the surface of the first side-part 2122 forms an acute angle with the first surface 211. In FIG. 11C, the cross-sectional shape of the convex part 212 is a isosceles trapezoid, so the first side-part 2122 and the second side-part 2123 are both symmetrical to the top surface 2121 whose surface is parallel to the first surface 211. In FIG. 11D, the cross-sectional shape of the convex part is an isosceles triangle, so this embodiment is similar to the embodiment in FIG. 11A except that the top surface 2121 is a chamfered surface. In FIG. 11E, the cross-sectional shape of the convex part 212 is a right trapezoid, so the surface of the first side-part 2122 of the convex part 212 is perpendicular to the first surface 211 and the surface of the second side-part 2123 forms an acute angle with the first surface 211. The surface of the top surface 2121 is parallel to the first surface 211. In FIG. 11F, the cross-sectional shape of the convex part 212 is a right trapezoid with chamfered top surface, so comparing to FIG. 11E, the top surface 2121 of this embodiment is chamfered (also called filleted). The cross-sectional shape of the convex part 212 and the placements of the top surface 2121, the first side-part 2122, the second side-part 2123, and the first surface 211 may all be modified accordingly. Moreover, similar to the convex part described above, the cross sectional shape of the concave part of the embodiment (not shown in FIGs) may be rectangle, circular arc, semicircle, cylinder, isosceles triangle with chamfered top surface, isosceles triangle, right triangle, isosceles trapezoid, right trapezoid, or isosceles trapezoid with chamfered top surface according to the requirement.

Figure 13:
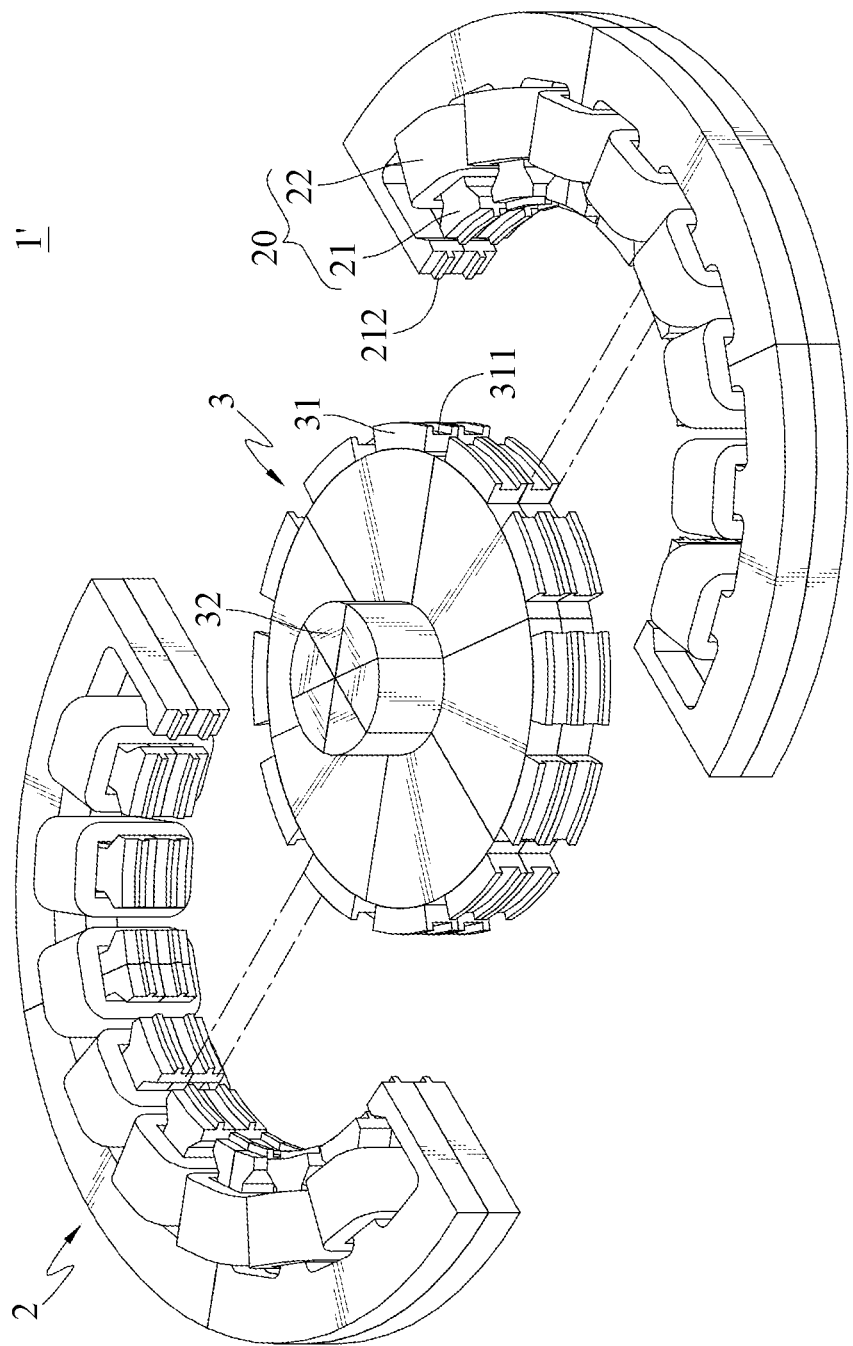
FIG. 13 a perspective exploded diagram of the example mover and stator assembly of electric machine in an embodiment.
Figure 14:
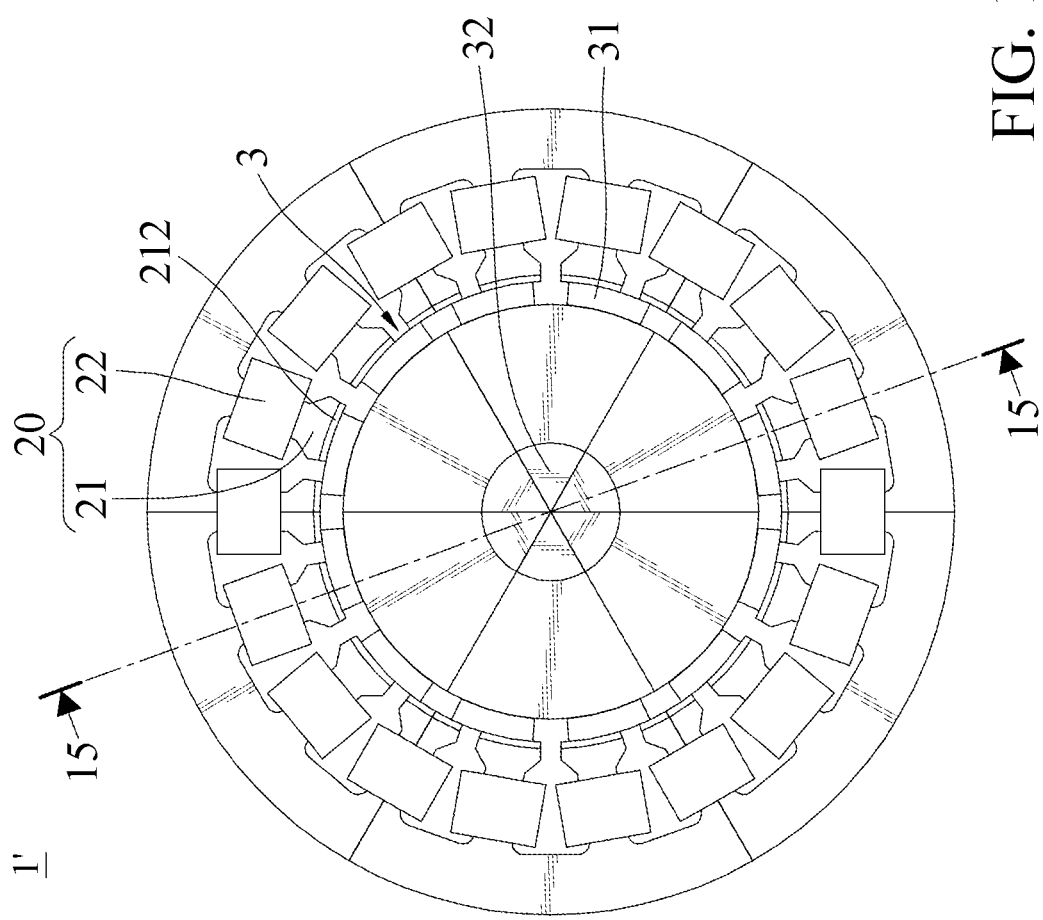
FIG. 14 is a top view diagram of the example mover and stator assembly of electric machine in an embodiment.
Figure 15:
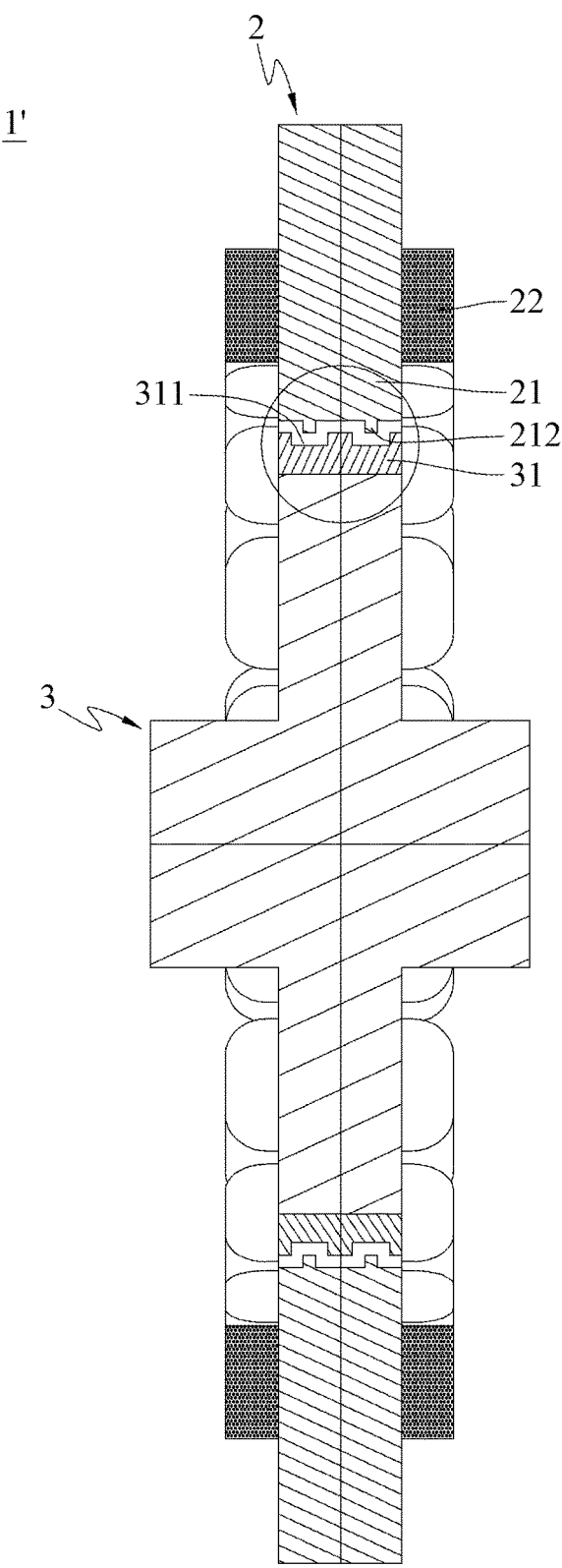
FIG. 15 is a cutaway diagram of FIG. 14 along the line 15-15.
Figure 16A:
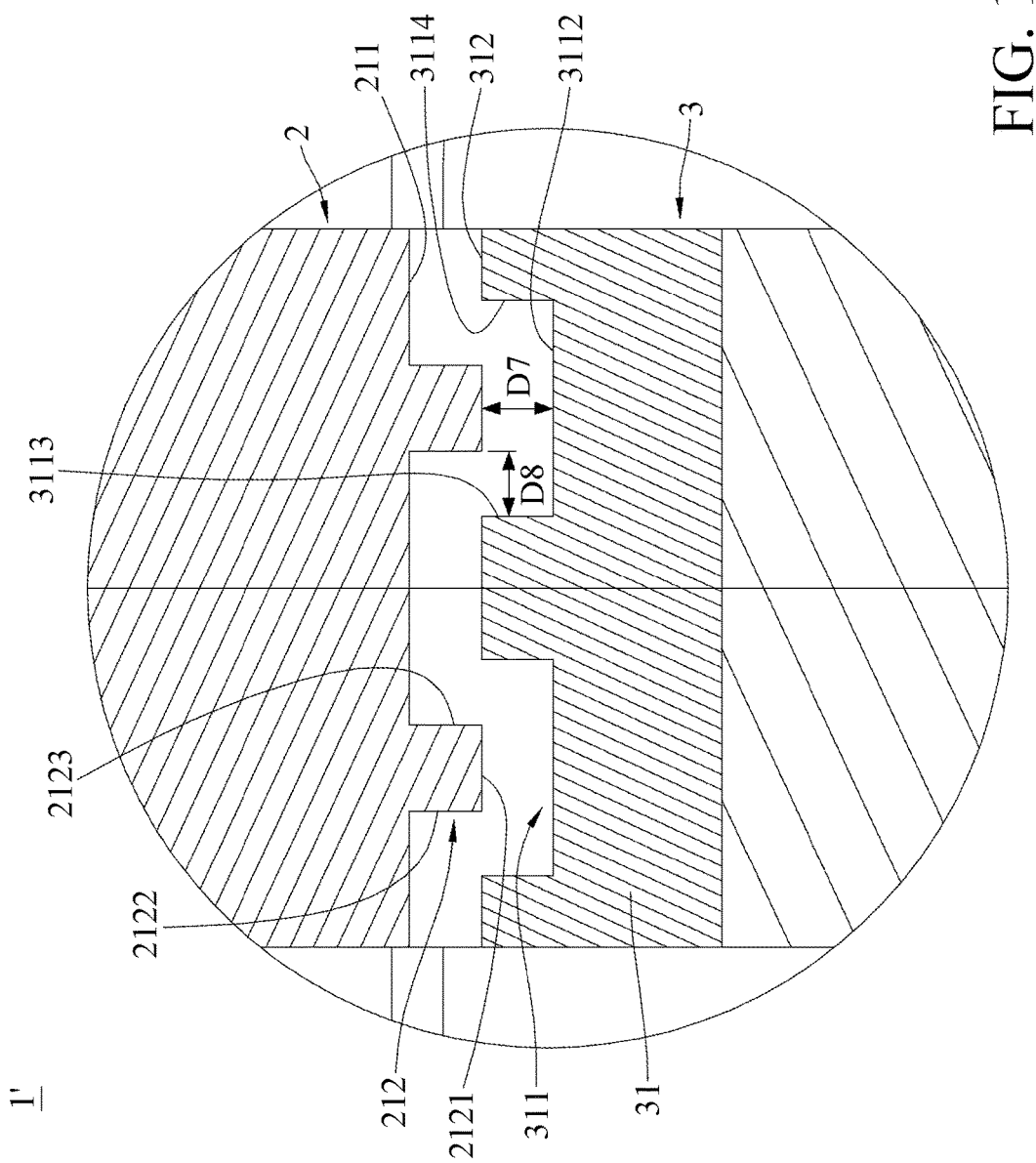
FIG. 16A is a partial enlarged cutaway diagram of the example mover and stator assembly of electric machine in FIG. 15.

The above description is about the axial mover and stator assembly of electric machine 1. The description below is about the radial mover and stator assembly of electric machine. Referring to FIGS. 12, 13, 14, 15, and 16A, FIG. 12 is a perspective view of an example mover and stator assembly of electric machine in an embodiment. FIG. 13 a perspective exploded diagram of the example mover and stator assembly of electric machine in an embodiment. FIG. 14 is a top view diagram of the example mover and stator assembly of electric machine in an embodiment. FIG. 15 is a cutaway diagram of FIG. 14 along the line 15-15. FIG. 16A is a partial enlarged cutaway diagram of the example mover and stator assembly of electric machine in FIG. 15. In this embodiment, a mover and stator assembly of electric machine 1' comprises a stator 2 and a rotor 3. The stator 2 radially surrounds the rotor 3. When in motion, the rotor 3 rotates relatively to the stator 2 along the rotation axis A. The stator 2 comprises several first magnetic parts 20. Each of the first magnetic parts 20 comprises a magnetic conductive part 21 and a solenoid 22. Each of the magnetic conductive parts 21 has a first surface 211 and two convex parts 212 set up at the first surface 211. The solenoids 22 are coiled around the magnetic conductive parts 21 respectively. In this embodiment, the rotor 3 comprises several second magnetic parts 31 and a rotation shaft 32. The rotation shaft 32 is surrounded by the several second magnetic parts 31. Each of the second magnetic parts 31 has a second surface 312 and two concave parts 311 set up at the second surface 312. Each of the second surfaces 312 of the second magnetic parts 31 faces outward. The first surface 211 and its two convex parts 212 face the second surface 312 and its two concave parts 311. In other words, the direction from the first surface 211 to the second surface 312 is perpendicular to the rotation axis A of the rotor 3. Also, the number of the first magnetic parts 20 and the number of the second magnetic parts 31 are not the same.

The description below is about the structure of the first magnetic part 20 and the second magnetic part 31 of the mover and stator assembly of electric machine 1'. Referring to FIG. 15 and FIG. 16A, each of the convex parts 212 of the magnetic conductive parts 21 has a top surface 2121, a first side-part 2122, and a second side-part 2123. The two sides of the top surface 2121 connect to the first side-part 2122 and the second side-part 2123. The first side-part 2122 and the second side-part 2123 connect to the first surface 211. The concave part 311 has a bottom surface 3112, a first side-wall 3113, and a second side-wall 3114. The two sides of the first side-wall 3113 and the second side-wall 3114 connect to the bottom surface 3112 and the second surface 312 respectively. In this embodiment, the perpendicular distance D7 of the top surface 2121 and the bottom surface 3112 equals to the perpendicular distance D8 of the first side-part 2122 and the first side-wall 3113. However, in other embodiments, the perpendicular distance D7 of the top surface 2121 and the bottom surface 3112 may be greater or smaller than the perpendicular distance D8 of the first side-part 2122 and the first side-wall 3113. Moreover, in this embodiment, the top surface 2121 is located on the extending surface of the second surface 312, so the convex part 212 is not located inside the concave part 311.

Figure 16B:
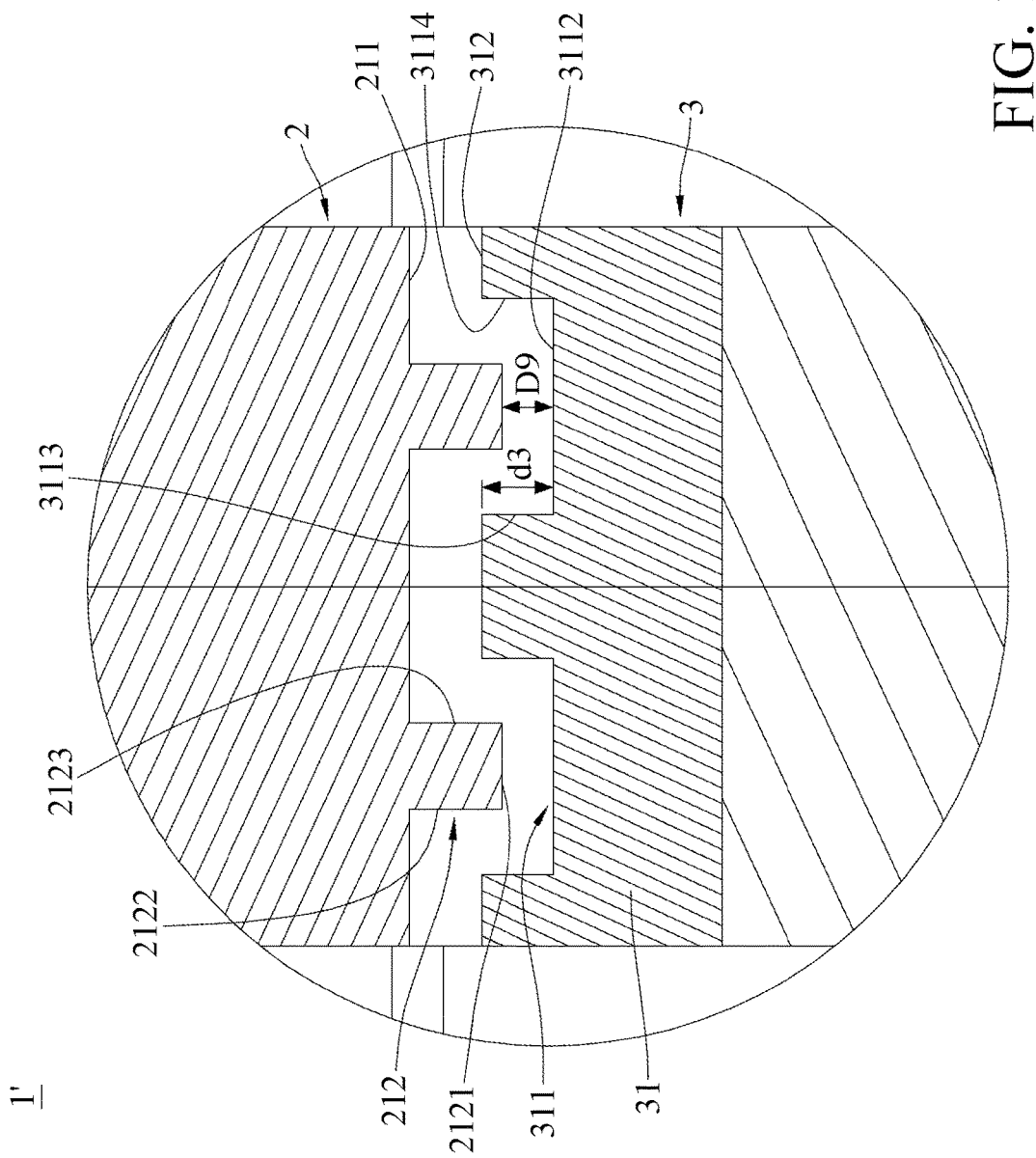
FIGS. 16B, 16C, 17A, and 17B are partial enlarged cutaway diagrams of an example mover and stator assembly of electric machine in an embodiment.

In other embodiments, Please refer to FIG. 16B, which is a partial enlarged cutaway diagrams of an example mover and stator assembly of electric machine in an embodiment. The perpendicular distance D9 of the top surface 2121 and the bottom surface 3112 is smaller than the depth d3 of the concave part 311, so part of the volume of the convex part 212 is located inside the concave part 311, thereby achieving the increase of rotation torque.

Figure 16C:
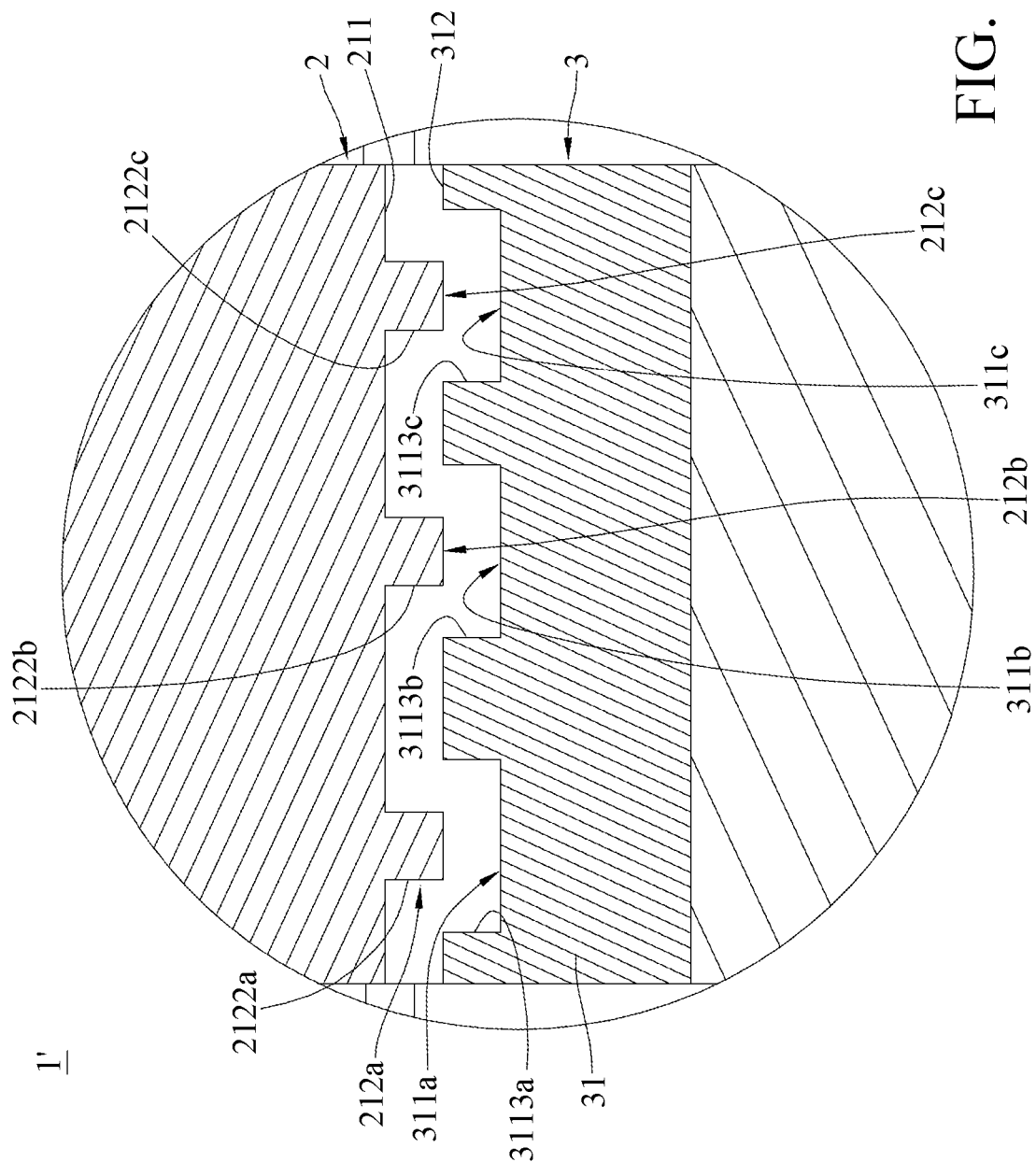

The first magnetic part 20 and the second magnetic part 31 described above only have two convex parts 212 and two concave parts 311 respectively, but the number of convex parts 212 and concave parts 311 do not have any limitations on the disclosure. FIG. 16C is a partial enlarged cutaway diagram of an example mover and stator assembly of electric machine in an embodiment. In this embodiment, each of the stators 2 comprises a first convex part 212a, a second convex part 212b, and a three convex part 212c. The distance between the first convex part 212a and the second convex part 212b is different from the distance between the second convex part 212b and the third convex part 212c. Each of the second magnetic parts 31 of the rotor 3 comprises a first concave part 311a, a second concave part 311b, and a third concave part 311c. The distance between the first concave part 311a and the second concave part 311b is different from the distance between the second concave part 311b and the third concave part 311c. In this embodiment, the first convex part 212a, the second convex part 212b, and the third convex part 212c each respectively have a first side-part 2122a, 2122b, and 2122c. The first side-parts 2122a, 2122b, and 2122c all face the same direction. The distance between the first side-part 2122a and 2122b is different from the distance between the first side-part 2122b and 2122c. Similarly, the first concave part 311a, the second concave part 311b, and the third concave part 311c each respectively has a first side-wall 3113a, 3113b, and 3113c. The first side-walls 3113a, 3113b, and 3113c all face the same direction. The distance between the first side-wall 3113a and 3113b is different from the distance between the first side-wall 3113b and 3113c.

However, in other embodiments, the distance between the first convex part 212a and the second convex part 212b equals to the distance between the second convex part 212b and the third convex part 212c; the distance between the first concave part 311a and the second concave part 311b equals to the distance between the second concave part 311b and the third concave part 311c.

Figure 17A:
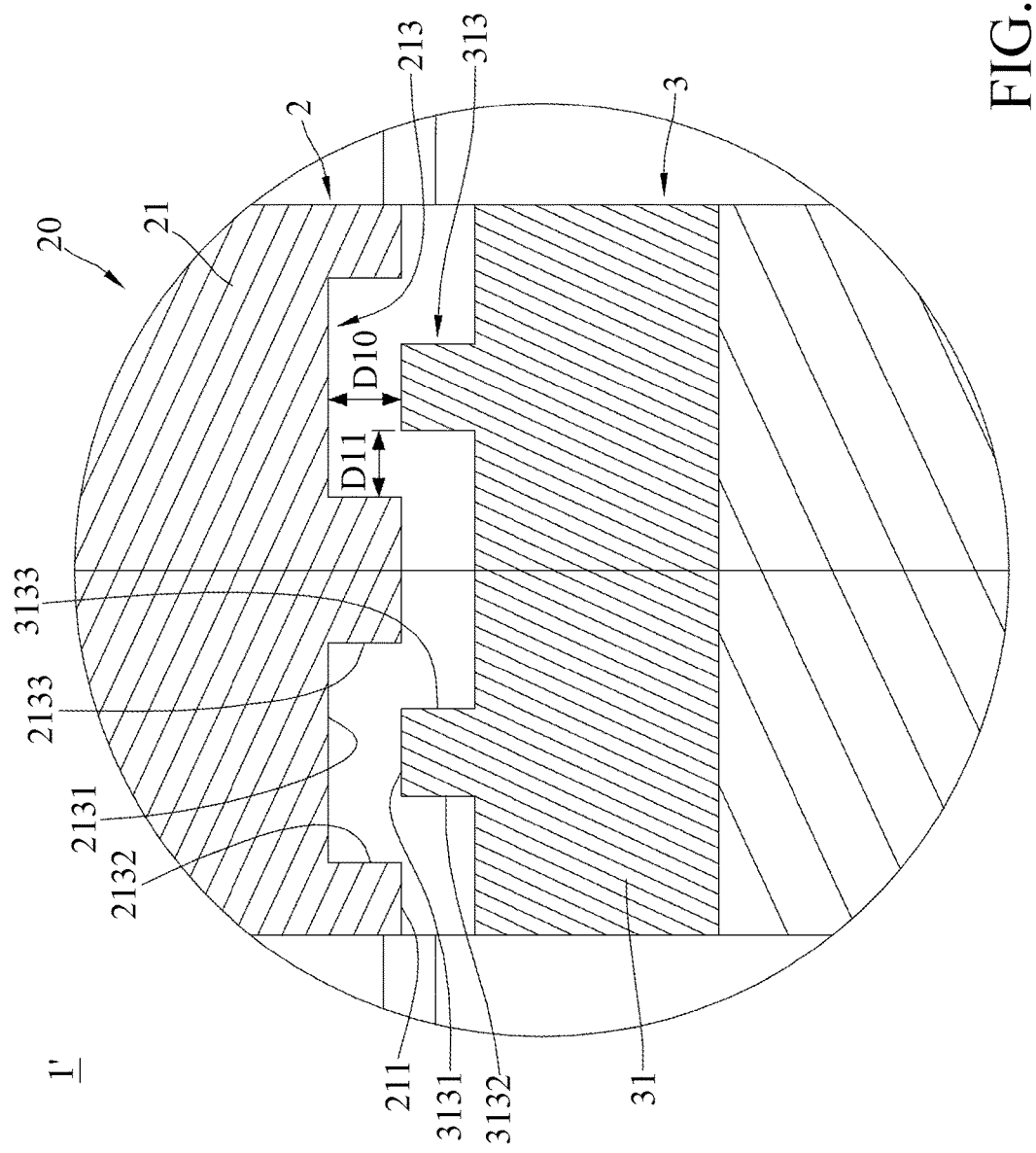

In the description of the mover and stator assembly of electric machine 1' above, the stator 2 comprises the convex parts 212 and the rotor 3 comprises the concave parts 311. However, in other embodiments, the stator 2 may comprise concave parts and rotor 3 may comprise convex parts. Please refer to FIG. 17A, which is a partial enlarged cutaway diagram of an example mover and stator assembly of electric machine in an embodiment. This embodiment is similar to the embodiments described above. In the mover and stator assembly of electric machine 1', each of the first magnetic parts 20 of the stator 2 has a first surface 211 and a concave part 213 set up at the first surface 211. Each of the second magnetic parts 31 of the rotor 3 has a second surface 312 and a convex part 313 protruding from the second surface 312. The first surface 211 and the second surface 312 face each other. The width of each of the convex parts 313 is smaller than the width of each of the concave parts 213. In this embodiment, each of the concave parts 213 has a bottom surface 2131, a first side-wall 2132, and a second side-wall 2133; each of the convex parts 313 has a top surface 3131, a first side-part 3132, and a second side-part 3133. In this embodiment, the perpendicular distance D10 from the top surface 3131 of the convex part 313 to the bottom surface 2131 of the concave part 213 equals to the perpendicular distance D11 from the first side-wall 2132 to the first side-part 3132. Moreover, the convex part 313 is not inserted inside the concave part 213.

Also, in other embodiments, the perpendicular distance D10 from the top surface 3131 of the convex part 313 to the bottom surface 2131 of the concave part 213 is different from the perpendicular distance D11 from the first side-wall 2132 to the first side-part 3132. In other embodiments, the top surface 3131 of the convex part 313 is between the bottom surface 2131 of the concave part 213 and the first surface 211, so part of the volume of the convex part 212 is located inside the concave part 213.

Figure 17B:
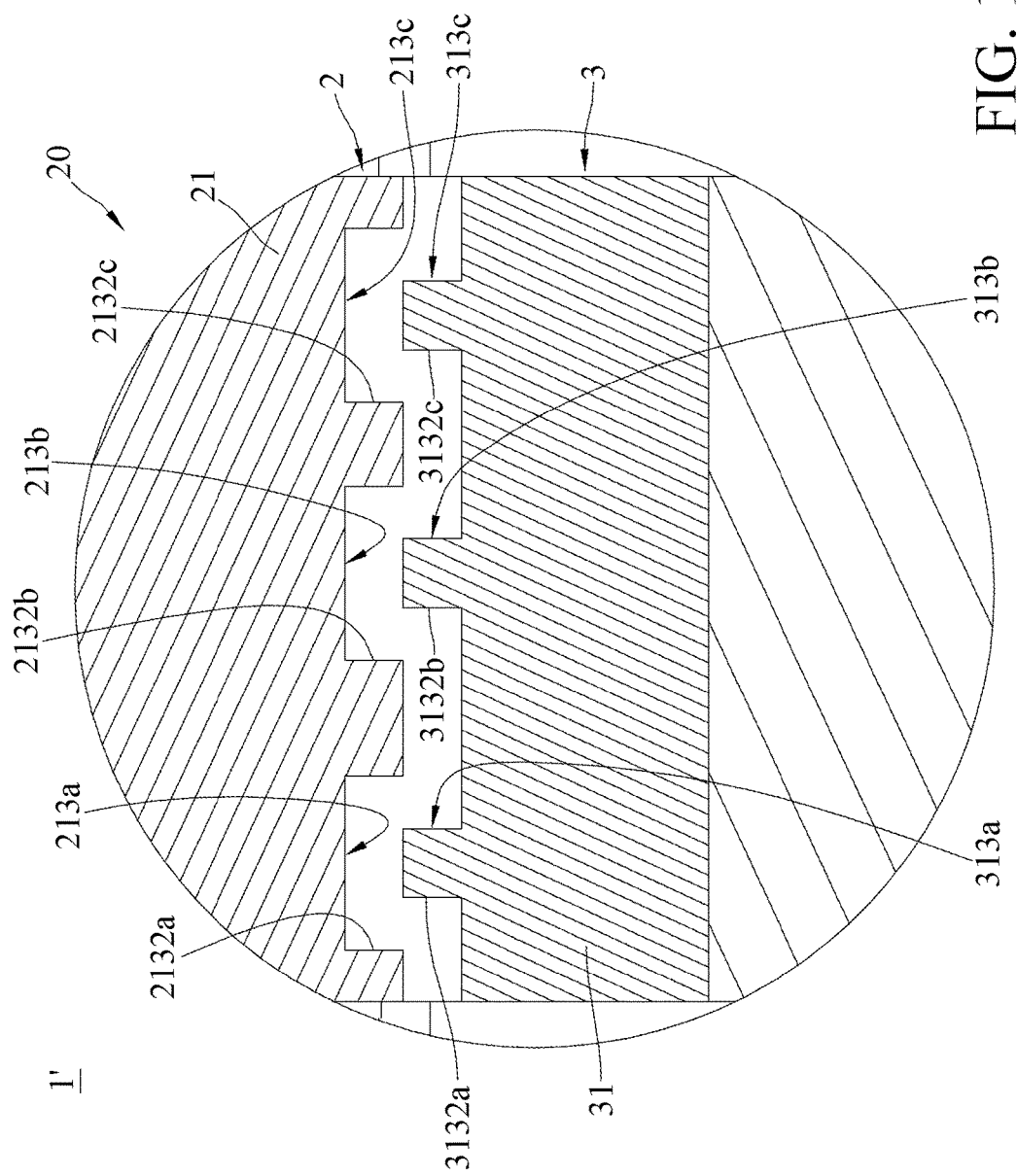

The number of convex parts 313 and concave parts 213 described above is not to have any limitations on the disclosure. FIG. 17B is a partial enlarged cutaway diagram of an example mover and stator assembly of electric machine in an embodiment. This embodiment is similar to the embodiment of FIG. 16B and FIG. 17A. Each of the first magnetic parts 20 comprises a first concave part 213a, a second concave part 213b, and a third concave part 213c. The distance from the first concave part 213a to the second concave part 213b is different to the distance from the second concave part 213b to the third concave part 213c. Each of the second magnetic parts 31 comprises a first convex part 313a, a second convex part 313b, and a third convex part 313c. The distance from the first convex part 313a to the second convex part 313b is different to the distance from the second convex part 313b to the third convex part 313c. In this embodiment, the first concave part 213a, the second concave part 213b, and the third concave part 213c each respectively has a first side-wall 2132a, 2132b, and 2132c. The first side-walls 2132a, 2132b, and 2132c all face the same direction. The distance between the first side-wall 2132a and 2132b is different from the distance between the first side-wall 2132b and 2132c. Similarly, the first convex part 313a, the second convex part 313b, and the third convex part 313c each respectively has a first side-part 3132a, 3132b, and 3132c. The first side-parts 3132a, 3132b, and 3132c all face the same direction. The distance between the first side-part 3132a and 3132b is different from the distance between the first side-part 3132b and 3132c.

However, in other embodiments, the distance from the first concave part 213a to the second concave part 213b may equal to the distance from the second concave part 213b to the third concave part 213c; the distance from the first convex part 313a to the second convex part 313b may also equal to the distance from the second convex part 313b to the third convex part 313c.

The simulation analysis of the Experimental Group 1 described below is about the axial structure of the single stator 2 and single rotor 3 in FIG. 7. This mover and stator assembly of electric machine 1 uses the permanent magnet axial gap motor. The external diameter of the rotation shaft 32 is 14 mm and the external diameter of the rotor 3 is 24 mm. The electric energy is inputted by 3 phase direct current (dc) voltage with the rated power being 80 Watts. Magnet Volume is the volume of the magnet inside the magnetic conductive part of the rotor. Total Thickness includes the stator 2 and the rotor 3 of the mover and stator assembly of electric machine. Magnetic Flux Density is the total magnetic flux through the gaps of the mover and stator assembly of electric machine 1. Weighted Axial Magnetic Flux Density is the magnetic flux of the single direction along the rotation axis A. Torque is the torque outputted by the rotor 3. Control Group 1 and Control Group 2 are the simulation analysis of the mover and stator assemblies of electric machine in the prior art, so Control Group 1 and Control Group 2 do not have the convex and concave parts disclosed in this disclosure. Moreover, Control Group 1 has the same stator volume of Control Group 2. Control Group 2 has the same magnet volume as the Experimental Group 1. The columns of volume, thickness, magnetic flux, torque, and torque density difference below are comparisons of Experimental Group 1 to Control Group 1 and Control Group 2.

TABLE 1-B

Comparisons of Experimental Group 1 with Control Group 1 and Control Group 2.

| | Weighted Axial Magnetic Flux Density (mT) | Difference in Weighted Axial Magnetic Flux (%) | Torque (mN-m) | Difference in torque (%) | Difference in torque density (%) |
|---|---|---|---|---|---|
| Control Group 1 | 642.73 | 9.52 | 43.46 | −0.65 | 4.37 |
| Control Group 2 | 619.96 | 13.5 | 38.28 | 12.8 | 14.84 |
| Experimental Group 1 | 703.94 | — | 43.17 | — | — |

According to the simulation analysis shown above, comparing Experimental Group 1 with Control Group 1, Experimental Group 1 has a lower magnet volume and total thickness under the condition of having the same torque, so the material cost may be reduced. Moreover, the total magnetic flux density, weighted axial magnetic flux density, and torque density of Experimental Group 1 are much higher.

Comparing Experimental Group 1 with Control Group 2, Experimental Group 1 has a thinner thickness under the condition of having the same magnet volume. Moreover, the total magnetic flux density, weighted axial magnetic flux density, torque, and torque density of Experimental Group 1 are much higher.

The experimental group and control group below are compared under the condition of having the same rotor's volume and with different gaps. The torque is compared between the experimental group, which has the convex and concave parts, and the control group, which does not have the convex and concave parts. The gaps for the experimental group are the gaps between the convex parts 212 and the concave parts 311 in the embodiments. The gaps for the control group are the gaps between the rotor and the stator. Moreover, the experimental group 1 is the single gap axial permanent magnet motor described above. The experimental group 2 is the mover and stator assembly of electric machine 1 shown in the embodiments from FIG. 1 to FIG. 5A with rated power being 1500 W, 3 phase alternate current voltage, external diameter of the rotation shaft being 86 mm, and external diameter of the rotor being 170 mm. The experimental group 3 is the mover and stator assembly of electric machine 1 shown in FIGS. 13 to 16A applied for the simulation of a single gap radial motor with rated power being 7500 W, 3 phase alternate current voltage, thickness of the mover and stator assembly of electric machine being 150

TABLE 1-A

Comparisons of Experimental Group 1 with Control Group 1 and Control Group 2.

| | Magnet Volume (mm³) | Difference in Volume (%) | Total Thickness (mm) | Difference in thickness (%) | Total Magnetic Flux Density (mT) | Difference in Magnetic Flux (%) |
|---|---|---|---|---|---|---|
| Control Group 1 | 373 | −10.7 | 10.4 | −4.8 | 695.56 | 9.2 |
| Control Group 2 | 333 | 0 | 10.08 | −1.8 | 688.96 | 10.2 |
| Experimental Group 1 | 333 | — | 9.9 | — | 759.52 | — | mm, external diameter of the rotation shaft 32 being 48 mm, and external diameter of the rotor being 210 mm.

TABLE 2

Torque comparison of experimental group and control group

| | Torque (N-M) | | | | | |
|---|---|---|---|---|---|---|
| | Simulation 1 80 W single gap Axial permanent magnet motor | | Simulation 2 1,500 W double gaps Axial permanent magnet motor | | Simulation 3 7,500 W single gap Radial motor | |
| | Gap (mm) | | | | | |
| | 1 | 0.6 | 1 | 0.8 | 1 | 0.8 |
| Experimental Group | 0.04317 | 0.05192 | 9.80 | 12.08 | 31.18 | 33.01 |
| Control Group | 0.03828 | 0.04572 | 7.68 | 8.88 | 29.71 | 29.92 |
| Difference (%) | 12.8 | 13.6 | 27.6 | 36.0 | 4.9 | 10.3 |

From the simulation results above, the torque of each experimental group is all higher than the torque of its corresponding control group. Thus, the mover and stator assembly of electric machine may direct and gather the magnetic circuit to reduce the side magnetic loss during the rotation of the rotor. The magnetic flux density is then increased to enhance the efficiency of the first magnetic part and the second magnetic part, so the total efficiency may be enhanced. Moreover, the gap distance and the torque in the simulations of the mover and stator assembly of electric machine above are inversely proportional to each other.

Figure 18:
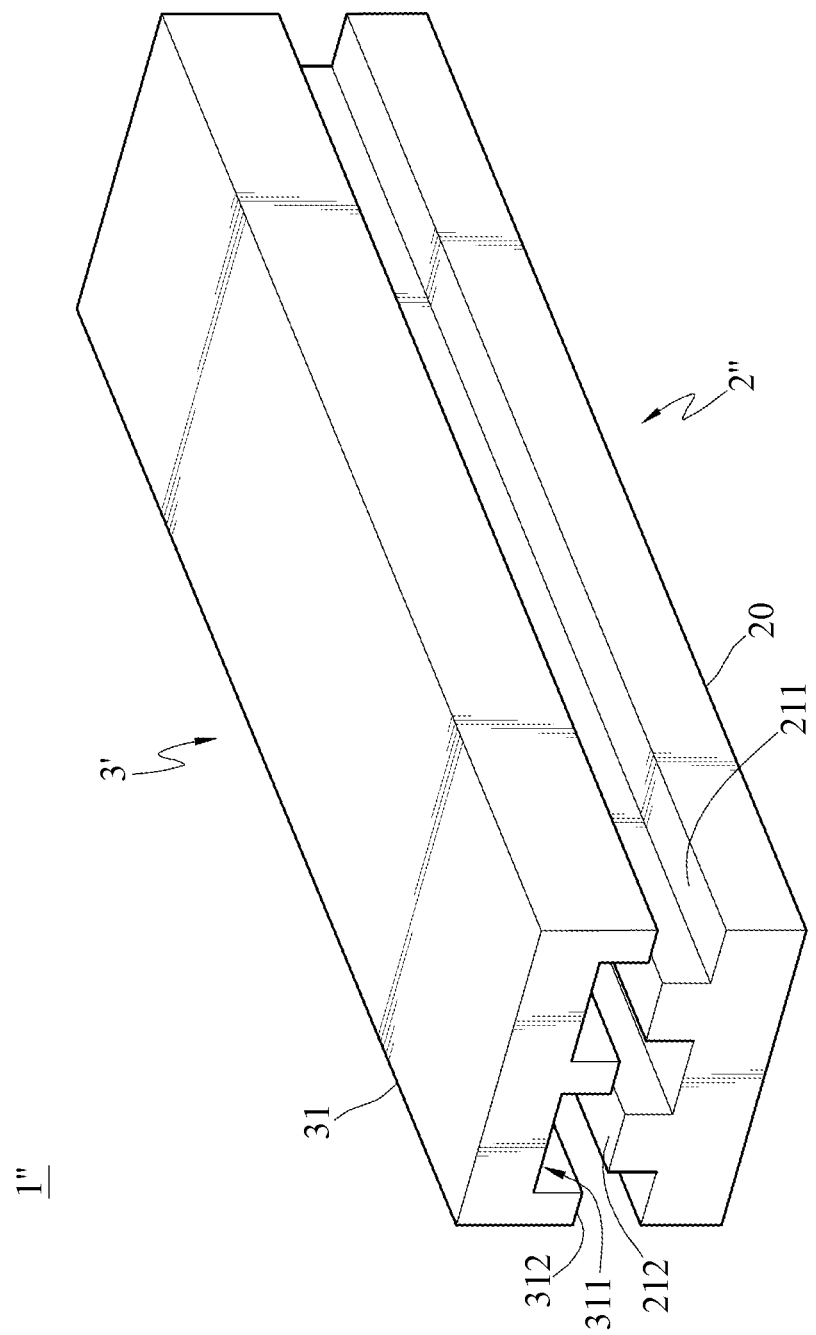
FIG. 18 is a perspective view of an example mover and stator assembly of electric machine in an embodiment.

The rotor and stator structure with convex and concave parts described above may apply to linear movement structure. Please refer to FIG. 18, which is a perspective view diagram of an example mover and stator assembly of electric machine in an embodiment. The mover and stator assembly of electric machine 1' of the embodiment is a linear movement structure and comprises a stator 2' and a moving part 3'. The stator 2' comprises a first magnetic part 20, which further comprises a first surface 211 and two convex parts 212 protruding from the first surface 211. The moving part 3' comprises a second magnetic part 31, which further comprises a second surface 312 and two concave parts 311 set up at the second surface 312. The first surface 211 faces the second surface 312. The width of the convex parts 212 is smaller than the width of the concave parts 311. The convex parts 212 and the concave parts 311 are set up along the moving direction of the moving part 3'. When in motion, the concave parts 311 move linearly along the convex parts 212. The number of convex parts and concave parts are not to have any limitations on this disclosure. In other embodiments, the number of convex parts 212 and concave parts 311 may be one, two, or greater than two. The set up of the convex parts 212 and convex parts 311 above may prevent side magnetic loss and increase the magnetic flux density between the stator 2' and the moving part 3', thereby increasing the output torque.

In this embodiment, the second magnetic part 31 is a permanent magnet or a magnetic conductive part. The magnetic conductive part is a silicon-steel sheet. Or the material of the magnetic conductive part is soft magnetic composite (SMC) material.

However, in other embodiments, the stator 2' of the mover and stator assembly of electric machine 1' may not have convex part and the moving part 3' may not have concave part. The first magnetic part 20 of the stator 2' may comprise a concave part set up at the first surface (not shown in FIG). The second magnetic part 31 of the moving part 3' may comprise a convex part set up at the second surface (not shown in FIG). The convex part and the concave part face each other. The convex part moves linearly along the concave part to achieve the effect of increase in power in the disclosure.

In this disclosure, the cross-sectional shape of the convex part 212 of the mover and stator assembly of electric machine 1' may be rectangle, circular arc, semicircle, cylinder, isosceles triangle with chamfered top surface, isosceles triangle, right triangle, isosceles trapezoid, right trapezoid, or right trapezoid with chamfered top surface. The cross-sectional shape of the concave part 311 of the mover and stator assembly of electric machine 1' may be rectangle, circular arc, semicircle, cylinder, isosceles triangle with chamfered top surface, isosceles triangle, right triangle, isosceles trapezoid, right trapezoid, or right trapezoid with chamfered top surface.

Figure 19A:
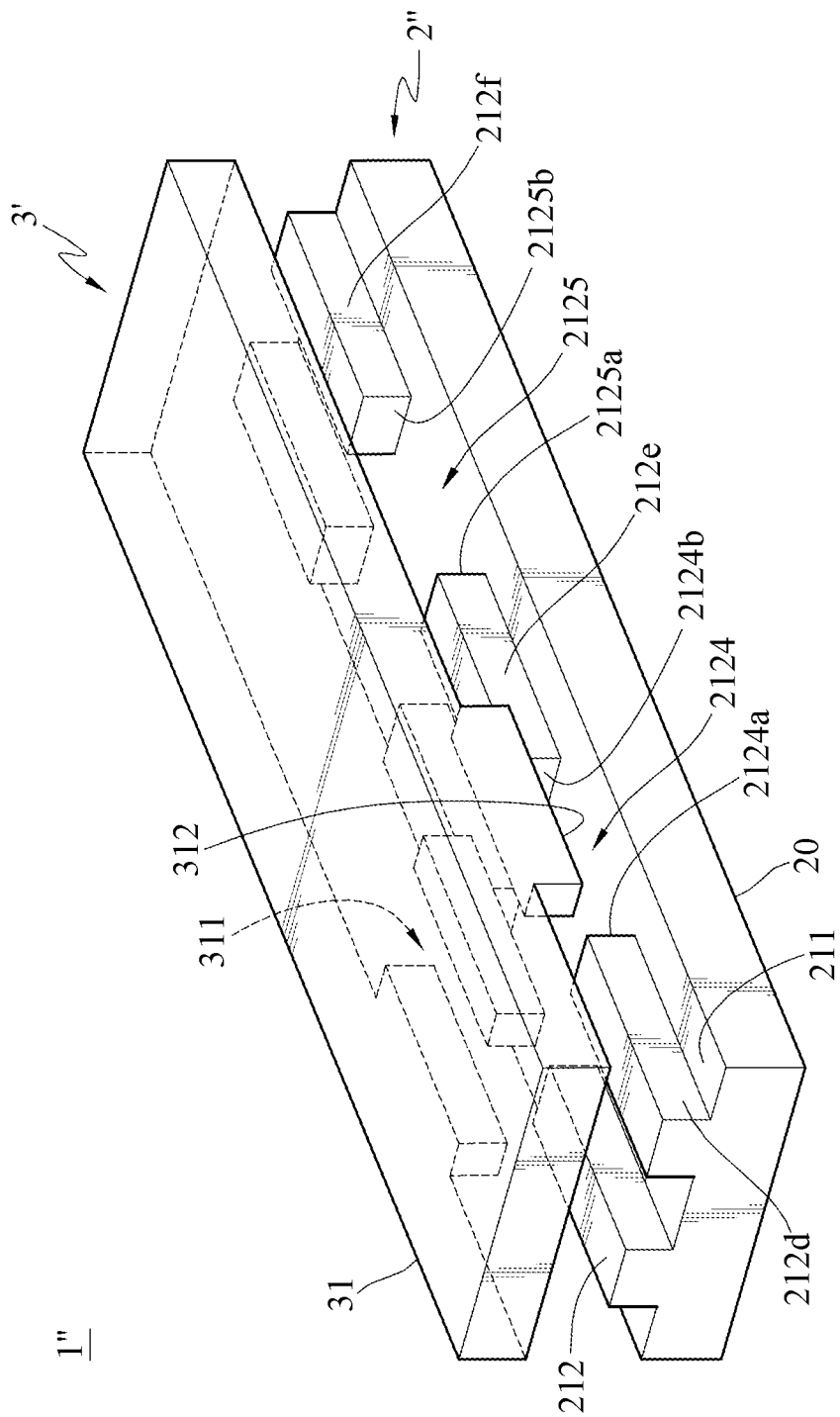
FIGS. 19A and 19B are perspective diagrams of an example mover and stator assembly of electric machine in an embodiment.

Please refer to FIG. 19A, which is a perspective diagram of an example mover and stator assembly of electric machine in an embodiment. This embodiment is similar to the embodiment in FIG. 18. In this embodiment, the two convex parts 212 each respectively have three convex sections 212d, 212e, and 212f. The three convex sections 212d, 212e, and 212f are set up separately along the moving direction of the moving part 3'. There is a concave section, 2124 and 2125, between each of the three convex sections 212d, 212e, and 212f. The concave sections 2124 and 2125 each respectively have a first wall 2124a, 2125a and a second wall 2124b, 2125b. The first walls 2124a and 2125a face the same direction and the second walls 2124b and 2125b also face another same direction. In this embodiment, the distance between the first walls 2124a and 2125a equals to the distance between the second walls 2124b and 2125b. In other words, the concave sections have the same width, so the convex sections 212d, 212e, and 212f have the same gap distance between each other, thereby increasing the output torque of the mover and stator assembly of electric machine.

Furthermore, when the stator 2' comprises concave part and the moving part 3' comprises convex part (not shown in FIG), the convex parts of the moving part 3' may comprise several convex sections and concave sections between the convex sections. The convex sections are set up separately with same gap distance in between.

Figure 19B:
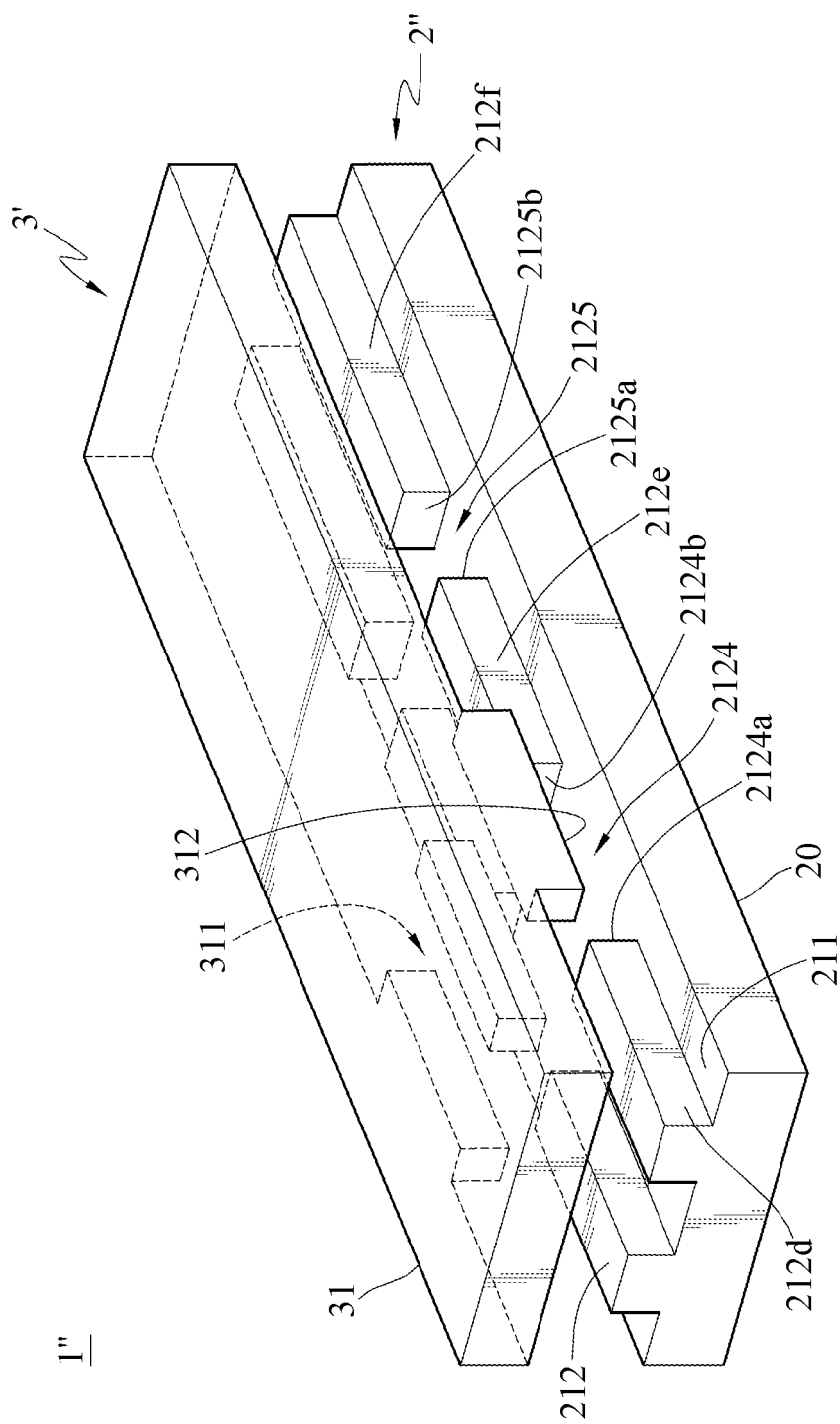

Please refer to FIG. 19B, which is a perspective diagram of an example mover and stator assembly of electric machine in an embodiment. In this embodiment, the convex part 212 has three convex sections 212d, 212e, and 212f set up separately along the moving direction of the moving part 3'. There is a concave section, 2124 and 2125, between each of the three convex sections 212d, 212e, and 212f. The concave sections 2124 and 2125 each respectively have a first wall 2124a, 2125a and a second wall 2124b, 2125b. The distance between the first walls 2124a and 2125a is different from the distance between the second walls 2124b and 2125b. In other words, the concave sections 2124, 2125 have different width and the convex sections 212d, 212e, and 212f have different gap distance between each other, thereby increasing the output torque of the mover and stator assembly of electric machine.

Furthermore, when the stator 2' comprises concave part and the moving part 3' comprises convex part (not shown in FIG), the convex parts of the moving part 3' may comprise several convex sections and concave sections between the convex sections. The convex sections are set up separately with different gap distance in between because of the different widths of the concave sections.

The magnetic conductive part in the disclosure may be soft magnetic composite (SMC) or resin-bonded magnet. Soft magnetic composite (SMC) is primarily made of iron, iron based powder, and different proportions of silicon, aluminum, manganese mixed together with binder. Binder is generally inorganic material such as mixture of phosphorus and silicon dioxide. Therefore, since the soft magnetic composite (SMC) is nonconductive, it is more capable of controlling the eddy current than the silicon-steel sheet in the prior art.

Furthermore, resin-bonded magnet is primarily made of neodymium, iron, and boron. Since resin-bonded magnet does not consist of dysprosium, the cost for materials may then be reduced. Also, with oxidation treatment on the surface of the magnetic conductive part, the lifespan of the magnetic conductive part may be increased.

According to the mover and stator assembly of electric machine in the disclosure, the structure of the corresponding convex and concave parts may direct and gather the magnetic flux to reduce the side magnetic loss during the rotation of the rotor. The magnetic flux density may then be increased to enhance the efficiency of the first magnetic part and the second magnetic part. Thus, the output torque may be increased to enhance the overall energy efficiency. Moreover, the mover and stator assembly of electric machine may use less materials than the assemblies in prior art to generate higher output torque and reduce the manufacturing cost.

What is claimed is:

1. A mover and stator assembly of electric machine, comprising:
   at least a stator comprising a plurality of first magnetic parts, wherein each of the first magnetic parts has a first surface and a convex part protruding from the first surface; and
   at least a rotor comprising a plurality of second magnetic parts, wherein each of the second magnetic parts has a second surface and a concave part set up at the second surface, the first surface and the second surface face each other, and the width of each of the convex parts is smaller than the width of each of the concave parts;
   wherein the convex parts comprises a first convex part, a second convex part, and a third convex part, the second convex part is located between the first convex part and the third convex part, the distance between the first convex part and the second convex part is different to the distance between the second convex part and the third convex part, the concave parts comprise a first concave part, a second concave part, and a third concave part, the second concave part is located between the first concave part and the third concave part, the distance between the first concave part and the second concave part is different to the distance between the second concave part and the third concave part.

2. The mover and stator assembly of electric machine of claim 1, wherein the concave parts are placed along a circular direction of the rotor to form a circular trough, when the rotor spins relatively to the stator, the projections of the convex parts to the rotor all lie inside the circular trough.

3. The mover and stator assembly of electric machine of claim 1, wherein each of the first magnetic parts comprises a magnetic conductive part and a solenoid, the solenoids are coiled around the magnetic conductive parts respectively, each of the magnetic conductive parts has the first surface and the convex part set up at the first surface.

4. The mover and stator assembly of electric machine of claim 1, wherein each of the concave parts has a bottom surface, each of the convex parts has a top surface, the perpendicular distance from the bottom surface of the concave part to the top surface of the convex part is smaller than the depth of the concave part.

5. The mover and stator assembly of electric machine of claim 1, wherein each of the second magnetic parts is a permanent magnet or a magnetic conductive part.

6. The mover and stator assembly of electric machine of claim 5, wherein when each of the second magnetic parts is the magnetic conductive part, the magnetic conductive part is silicon steel, or the material of the magnetic conductive part is soft magnetic composite (SMC) material.

7. The mover and stator assembly of electric machine of claim 1, wherein the direction from the first surface to the second surface is parallel to the rotation axis of the rotor.

8. The mover and stator assembly of electric machine of claim 7, wherein the at least one stator is located at a side of the rotor.

9. The mover and stator assembly of electric machine of claim 7, wherein the number of the at least one stator is two, the rotor is between the two stators.

10. The mover and stator assembly of electric machine of claim 7, wherein each of the concave parts has a bottom surface, a first side-wall, and a second side-wall, each of the convex parts has a top surface, a first side-part, and a second side-part, wherein the bottom surface of each of the concave parts faces the top surface of the convex part.

11. The mover and stator assembly of electric machine of claim 1, wherein the direction from the first surface to the second surface is perpendicular to the rotation axis of the rotor.

12. The mover and stator assembly of electric machine of claim 11, wherein the at least one stator surrounds the rotor.

13. The mover and stator assembly of electric machine of claim 1, wherein the cross-sectional shape of each of the convex parts is rectangle, circle, semicircle, cylinder, isosceles triangle with chamfered top surface, isosceles triangle, right triangle, isosceles trapezoid, right trapezoid, or isosceles trapezoid with chamfered top surface, the cross-sectional shape of each of the concave parts is rectangle, circle, semicircle, cylinder, isosceles triangle with chamfered top surface, isosceles triangle, right triangle, isosceles trapezoid, right trapezoid, or isosceles trapezoid with chamfered top surface.

14. A mover and stator assembly of electric machine, comprising:
   at least a stator comprising a plurality of first magnetic parts, each of the first magnetic parts has a first surface and a concave part set up at the first surface; and
   at least a rotor comprising a plurality of second magnetic parts, each of the second magnetic parts has a second surface and a convex part protruding from the second surface, the first surface and the second surface face each other and the width of each of the convex parts is smaller than the width of each of the concave parts;
   wherein the concave parts comprise a first concave part, a second concave part, and a third concave part, the second concave part is located between the first concave part and the third concave part, the distance between the first concave part and the second concave part is different to the distance between the second concave part and the third concave part, the convex parts comprise a first convex part, a second convex part, and a third convex part, the second convex part is located between the first convex part and the third convex part, the distance between the first convex part and the second convex part is different to the distance between the second convex part and the third convex part.

15. The mover and stator assembly of electric machine of claim 14, wherein each of the first magnetic part comprises a magnetic conductive part and a solenoid, the solenoids are coiled around the magnetic conductive parts respectively, each of the magnetic conductive parts has the first surface and the concave part set up at the first surface.

16. The mover and stator assembly of electric machine of claim 14, wherein each of the concave parts has a bottom surface, each of the convex parts has a top surface, the perpendicular distance from the top surface of the convex part to the bottom surface of the concave part is smaller than the depth of the concave part.

17. The mover and stator assembly of electric machine of claim 14, wherein the direction from the first surface to the second surface is parallel to the rotation axis of the rotor, also the at least one stator is located at one side of the rotor.

18. The mover and stator assembly of electric machine of claim 17, wherein the number of the at least one stator is two, the rotor is clamped between the two stators.

19. The mover and stator assembly of electric machine of claim 17, wherein each of the concave parts has a bottom surface, a first side-wall, and a second side-wall, each of the convex parts has a top surface, a first side-part, and a second side-part, wherein the bottom surface of each of the concave parts faces the top surface of each of the corresponding convex parts.

20. The mover and stator assembly of electric machine of claim 14, wherein the direction from the first surface to the second surface is perpendicular to the rotation axis of the rotor, and the at least one stator surrounds the rotor.

21. The mover and stator assembly of electric machine of claim 14, wherein the cross-sectional shape of each of the convex parts is rectangle, circle, semicircle, cylinder, isosceles triangle with chamfered top surface, isosceles triangle, right triangle, isosceles trapezoid, right trapezoid, or isosceles trapezoid with chamfered top surface, the cross-sectional shape of each of the concave parts is rectangle, circle, semicircle, cylinder, isosceles triangle with chamfered top surface, isosceles triangle, right triangle, isosceles trapezoid, right trapezoid, or isosceles trapezoid with chamfered top surface.

22. The mover and stator assembly of electric machine of claim 14, wherein each of the second magnetic parts is a permanent magnet or a magnetic conductive part.

23. The mover and stator assembly of electric machine of claim 22, wherein when each of the second magnetic parts is the magnetic conductive part, the magnetic conductive part is silicon steel, or the material of the magnetic conductive part is soft magnetic composite (SMC) material.

24. mover and stator assembly of electric machine, comprising:
a stator comprising a first magnetic part, wherein the first magnetic part has a first surface and at least one convex part protruding from the first surface; and
a moving part comprising a second magnetic part, wherein the second magnetic part has a second surface and at least one concave part set up at the second surface, the first surface and the second surface face each other and the width of the convex part is smaller than the width of the concave part, and the convex part and the concave part are set up along the moving direction of the moving part;
wherein each of the at least one convex part has at least three convex sections set up separately along the moving direction of the moving part, each of the at least three convex sections has a concave section, each of the concave sections has a first wall and a second wall facing each other, the distance between the first walls does not equal to the distance between the second walls.

25. The mover and stator assembly of electric machine of claim 24, wherein the cross-sectional shape of each of the convex parts is rectangle, circle, semicircle, cylinder, isosceles triangle with chamfered top surface, isosceles triangle, right triangle, isosceles trapezoid, right trapezoid, or isosceles trapezoid with chamfered top surface, the cross-sectional shape of each of the concave parts is rectangle, circle, semicircle, cylinder, isosceles triangle with chamfered top surface, isosceles triangle, right triangle, isosceles trapezoid, right trapezoid, or isosceles trapezoid with chamfered top surface.

26. The mover and stator assembly of electric machine of claim 24, wherein each of the second magnetic parts is a permanent magnet or a magnetic conductive part.

27. The mover and stator assembly of electric machine of claim 26, wherein the magnetic conductive part is silicon steel, or the material of the magnetic conductive part is soft magnetic composite (SMC) material.

28. A mover and stator assembly of electric machine, comprising:
a stator comprising a first magnetic part, the first magnetic part has a first surface and at least one concave part set up at the first surface; and
a moving part comprising a second magnetic part, the second magnetic part has a second surface and at least one convex part protruding from the second surface, the first surface and the second surface face each other, and the width of the convex part is smaller than the width of the concave part, and the convex part and the concave part are set up along the moving direction of the moving part;
wherein each of the at least one convex part has at least three convex sections set up separately along the moving direction of the moving part, each of the at least three convex sections has a concave section, each of the concave sections has a first wall and a second wall facing each other, the distance between the first walls does not equal to the distance between the second walls.

29. The mover and stator assembly of electric machine of claim 28, wherein the cross-sectional shape of each of the convex parts is rectangle, circle, semicircle, cylinder, isosceles triangle with chamfered top surface, isosceles triangle, right triangle, isosceles trapezoid, right trapezoid, or isosceles trapezoid with chamfered top surface, the cross-sectional shape of each of the concave parts is rectangle, circle, semicircle, cylinder, isosceles triangle with chamfered top surface, isosceles triangle, right triangle, isosceles trapezoid, right trapezoid, or isosceles trapezoid with chamfered top surface.

30. The mover and stator assembly of electric machine of claim 28, wherein each of the second magnetic parts is a permanent magnet or a magnetic conductive part.

31. The mover and stator assembly of electric machine of claim 30, wherein the magnetic conductive part is silicon steel, or the material of the magnetic conductive part is soft magnetic composite (SMC) material.

* * * * *